(12) United States Patent
Takesada et al.

(10) Patent No.: US 11,312,848 B2
(45) Date of Patent: *Apr. 26, 2022

(54) POWDER SLUSH MOLDED BODY OF VINYL CHLORIDE RESIN COMPOSITION, AND LAMINATE

(71) Applicants: KANEKA CORPORATION, Osaka (JP); TATSUTA CHEMICAL CO., LTD., Ibaraki (JP)

(72) Inventors: Kentaro Takesada, Ibaraki (JP); Kohei Hosomi, Hyogo (JP)

(73) Assignees: KANEKA CORPORATION, Osaka (JP); TATSUTA CHEMICAL CO., LTD., Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/756,660

(22) PCT Filed: Oct. 12, 2018

(86) PCT No.: PCT/JP2018/038111
§ 371 (c)(1),
(2) Date: Apr. 16, 2020

(87) PCT Pub. No.: WO2019/078112
PCT Pub. Date: Apr. 25, 2019

(65) Prior Publication Data
US 2020/0332106 A1    Oct. 22, 2020

(30) Foreign Application Priority Data

Oct. 16, 2017  (JP) .............................. JP2017-200592

(51) Int. Cl.
*C08L 27/06* (2006.01)
*B29C 41/18* (2006.01)
(Continued)

(52) U.S. Cl.
CPC .............. *C08L 27/06* (2013.01); *B29C 41/18* (2013.01); *B32B 5/18* (2013.01); *B32B 27/065* (2013.01);
(Continued)

(58) Field of Classification Search
CPC ......... B32B 27/065; B32B 5/18; B32B 27/40; B32B 27/304; B32B 2327/06;
(Continued)

(56) References Cited

U.S. PATENT DOCUMENTS 3,316,192 A * 4/1967 Seibel .................... C08K 5/005
524/114
5,677,356 A   10/1997 Shimizu et al.
(Continued)

FOREIGN PATENT DOCUMENTS

EP      0672709 A2   9/1995
EP      2975085 A1   1/2016
(Continued)

OTHER PUBLICATIONS

International Search Report issued in corresponding International Application No. PCT/JP2018/038111, dated Jan. 8, 2019 (2 pages).

(Continued)

*Primary Examiner* — Hai Vo
(74) *Attorney, Agent, or Firm* — Osha Bergman Watanabe & Burton LLP

(57) ABSTRACT

The present invention relates to a powder slush molded body of a polyvinyl chloride composition, the polyvinyl chloride composition containing a polyvinyl chloride, a plasticizer, and an acrylic polymer. The polyvinyl chloride composition contains the plasticizer in an amount of 110 parts by mass or more and 150 parts by mass or less with respect to 100 parts by mass of the polyvinyl chloride. When a cross section of the powder slush molded body extending in parallel with a (Continued)

(a)

(b)

thickness direction is observed under an optical microscope using reflected light, irregular scale-like polyvinyl chloride particles having a long diameter of 30 μm or more and 500 μm or less are continuous with one another via interfacial portions, and the number of aggregated particles of the acrylic polymer having a long diameter of 30 μm or more and 100 μm or less is 10 particles/mm$^2$ or less. Thus, provided are a powder slush molded body of a polyvinyl chloride composition having high flexibility after heat aging as well as favorable surface characteristics, and a laminate.

8 Claims, 12 Drawing Sheets

(51) Int. Cl.
| | | |
|---|---|---|
| *B32B 5/18* | (2006.01) | |
| *B32B 27/08* | (2006.01) | |
| *B32B 27/40* | (2006.01) | |
| *B32B 27/06* | (2006.01) | |
| *B29K 27/06* | (2006.01) | |
| *B29K 33/00* | (2006.01) | |
| *B32B 27/30* | (2006.01) | |
| *C08K 5/00* | (2006.01) | |
| *C08L 33/08* | (2006.01) | |

(52) U.S. Cl.
CPC .............. *B32B 27/08* (2013.01); *B32B 27/40* (2013.01); *B29K 2027/06* (2013.01); *B29K 2033/08* (2013.01); *B32B 27/304* (2013.01); *B32B 2266/0278* (2013.01); *B32B 2305/022* (2013.01); *B32B 2327/06* (2013.01); *B32B 2375/00* (2013.01); *B32B 2605/00* (2013.01); *C08K 5/0016* (2013.01); *C08L 33/08* (2013.01)

(58) Field of Classification Search
CPC ... B32B 2375/00; C08K 5/0016; B29C 41/18; B29K 2027/06; B29K 2033/08
See application file for complete search history.

(56) References Cited

U.S. PATENT DOCUMENTS

| | | | |
|---|---|---|---|
| 10,106,669 B2 | 10/2018 | Nishimura | |
| 2008/0139713 A1 | 6/2008 | Lee et al. | |
| 2016/0039963 A1 | 2/2016 | Fujikawa et al. | |
| 2016/0347932 A1 | 12/2016 | Nishimura | |
| 2017/0342186 A1 | 11/2017 | Fujikawa et al. | |
| 2020/0255644 A1* | 8/2020 | Takesada | B32B 27/40 |

FOREIGN PATENT DOCUMENTS

| | | |
|---|---|---|
| EP | 3121229 A1 | 1/2017 |
| JP | H01215845 A | 8/1989 |
| JP | H04-198247 A | 7/1992 |
| JP | H07-258448 A | 10/1995 |
| JP | H09067498 A | 3/1997 |
| JP | H09-143330 A | 6/1997 |
| JP | 2000336219 A | 12/2000 |
| JP | 2002194126 A | 7/2002 |
| JP | 2008512544 A | 4/2008 |
| JP | 2010-090326 A | 4/2010 |
| JP | 2010285506 A | 12/2010 |
| JP | 2012-7026 A | 1/2012 |
| JP | 2015-117314 A | 6/2015 |
| KR | 20160110839 A | 9/2016 |
| WO | 2006062366 A1 | 6/2006 |
| WO | 2014-141461 A1 | 9/2014 |

OTHER PUBLICATIONS

Written Opinion of the International Searching Authority issued in corresponding International Application No. PCT/JP2018/038111, dated Jan. 8, 2019 (5 pages).

Extended European Search Report issued in the counterpart European Patent Application No. 18868155.5, dated Jun. 9, 2021 (7 pages).

* cited by examiner

POWDER SLUSH MOLDED BODY OF VINYL CHLORIDE RESIN COMPOSITION, AND LAMINATE

TECHNICAL FIELD

The present invention relates to a powder slush molded body of a polyvinyl chloride composition to be favorably used as a facing material for vehicle interior parts, and a laminate.

BACKGROUND ART

A polyvinyl chloride composition has excellent chemical resistance and durability. In addition, a molded body obtained by molding a polyvinyl chloride composition blended with a plasticizer has excellent flexibility and a favorable texture and imparts a sense of luxuriousness, and is thus often used as a facing material for automobile interior parts such as an instrument panel and a door trim. In particular, a laminate and the like formed of a molded body obtained by molding a polyvinyl chloride composition through powder slush molding and a polyurethane resin or the like is suitably used for automobile interior parts.

However, a molded body obtained by molding a polyvinyl chloride composition blended with a plasticizer has a problem in that the plasticizer moves to the surface of the molded body under the influence of heat, light, or the like, and thus the flexibility of the molded body is likely to decrease. Therefore, the blend amount of the plasticizer is increased in order to improve the flexibility, but an increase in the blend amount of the plasticizer poses a problem in that, when a piece of cloth is used to wipe off dirt on the surface of the molded body, fibers attach to the surface. To address this, Patent Document 1 proposes that adhesion of fuzz to a polyvinyl chloride composition and bleeding of an additive in a polyvinyl chloride composition can be suppressed by further blending hydroxyl group-modified silicone oil into the polyvinyl chloride composition blended with a plasticizer. Patent Document 2 proposes that the surface characteristics and flexibility of a molded body are improved by using a polyvinyl chloride composition containing two types of polyvinyl chloride particles having different average particle diameters, and modified polyorganosiloxane particles.

PRIOR ART DOCUMENTS

Patent Documents

Patent Document 1: JP 2012-7026A
Patent Document 2: JP 2015-117314A

DISCLOSURE OF INVENTION

Problem to be Solved by the Invention

However, for the molded bodies made of the polyvinyl chloride compositions disclosed in Patent Documents 1 and 2, there has been demanded to further improve the surface characteristics while favorably maintaining flexibility after heat aging.

The present invention provides a powder slush molded body of a polyvinyl chloride composition that has high flexibility after heat aging as well as favorable surface characteristics, and a laminate.

Means for Solving Problem

The present invention relates to a powder slush molded body of a polyvinyl chloride composition, the polyvinyl chloride composition containing a polyvinyl chloride, a plasticizer, and an acrylic polymer, wherein the polyvinyl chloride composition contains the plasticizer in an amount of 110 parts by mass or more and 150 parts by mass or less with respect to 100 parts by mass of the polyvinyl chloride, and when a cross section of the powder slush molded body extending in parallel with a thickness direction is observed under an optical microscope using reflected light, irregular scale-like polyvinyl chloride particles having a long diameter of 30 μm or more and 500 μm or less are continuous with one another via interfacial portions, and the number of aggregated particles of the acrylic polymer having a long diameter of 30 μm or more and 100 μm or less is 10 particles/mm$^2$ or less.

It is preferable that, when the cross section of the powder slush molded body extending in parallel with the thickness direction is analyzed using laser Raman spectroscopy, a peak at a wave number of 600±5 cm$^{-1}$ originating from the acrylic polymer is present in a Raman spectrum of the interfacial portion. It is preferable that, when the cross section of the powder slush molded body extending in parallel with the thickness direction is analyzed using laser Raman spectroscopy, an intensity of a peak at a wave number of 666±5 cm$^{-1}$ originating from the plasticizer observed in a Raman spectrum of an inner portion of the polyvinyl chloride particle is higher than an intensity of a peak at a wave number of 666±5 cm$^{-1}$ originating from the plasticizer observed in a Raman spectrum of the interfacial portion. It is preferable that the interfacial portion has a thickness of 1 μm or more and 20 μm or less.

It is preferable that the acrylic polymer contains a constitutional unit derived from a (meth)acrylic ester in an amount of 50 mass % or more, and the (methacrylic ester includes at least one (meth)acrylic ester selected from the group consisting of a (meth)acrylic ester of an aliphatic alcohol having two or more carbon atoms and a (meth) acrylic ester of an aromatic alcohol. It is preferable that the plasticizer includes a trimellitate-based plasticizer.

In the present invention, it is preferable to use the powder slush molded body as a facing for a vehicle interior material.

The present invention also relates to a laminate obtained by laminating a polyurethane foam layer and the powder slush molded body.

In the present invention, it is preferable to use the laminate as a vehicle interior material.

Effects of the Invention

With the present invention, it is possible to provide a powder slush molded body of a polyvinyl chloride composition having high flexibility after heat aging as well as favorable surface characteristics, and a laminate using the same.

BRIEF DESCRIPTION OF DRAWINGS

FIG. 1(a) is a 20-fold magnified image, and FIG. 1(b) is a partially enlarged view of FIG. 1(a).

FIG. 9(a) is a 20-fold magnified image, and Magnified Images 1 to 3 are partially enlarged views of FIG. 9(a).

DESCRIPTION OF THE INVENTION

Figure 1:
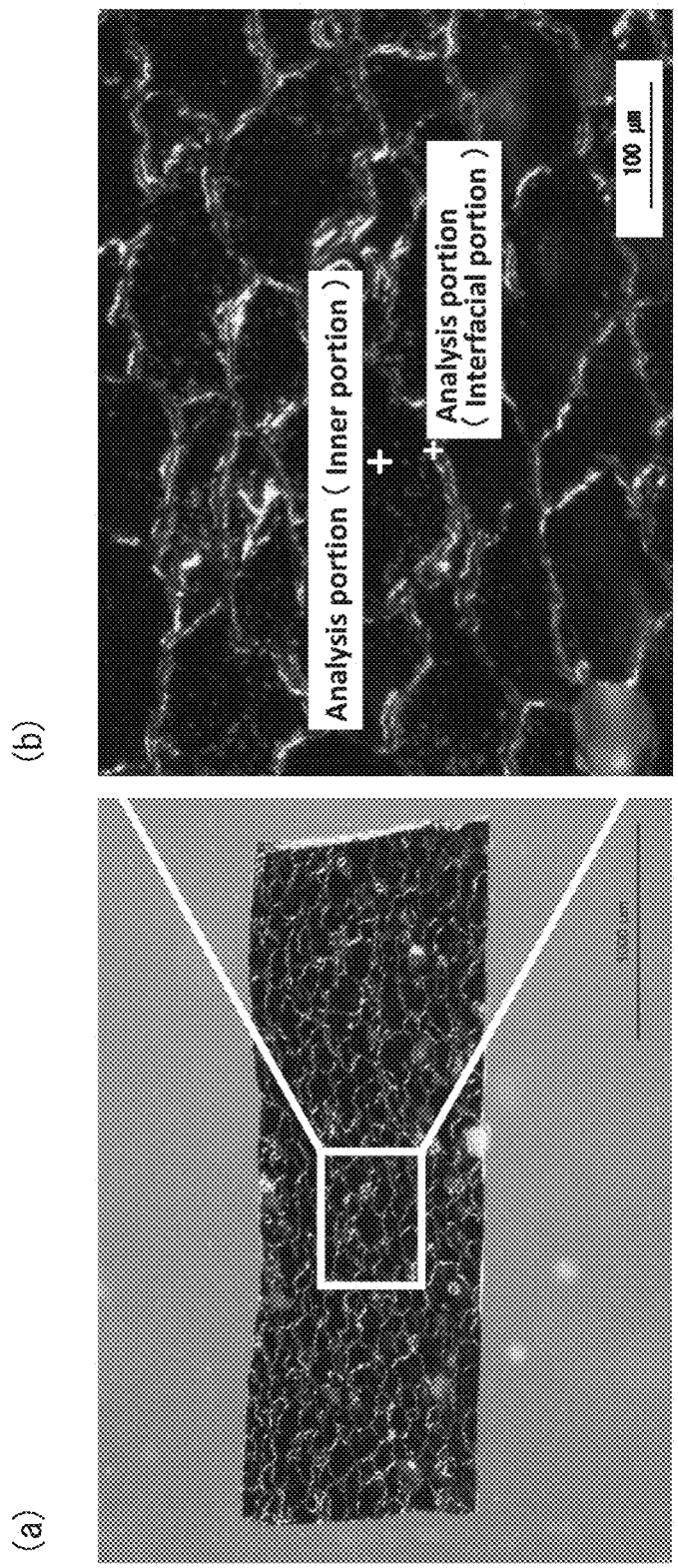
FIG. 1 shows images of a cross section of a powder slush molded body of Example 1 extending in parallel with a thickness direction observed under an optical microscope using reflected light.

The inventors of the present invention conducted numerous studies to solve the above-mentioned problems. As a result, they found that, when a powder slush molded body of a polyvinyl chloride composition (also referred to as "polyvinyl chloride molded body" hereinafter) containing a polyvinyl chloride, a plasticizer, and an acrylic polymer contained the plasticizer in an amount of 110 parts by mass or more and 150 parts by mass or less with respect to 100 parts by mass of the polyvinyl chloride, and when a cross section of the powder slush molded body extending in parallel with a thickness direction was observed under an optical microscope using reflected light, irregular scale-like polyvinyl chloride particles having a long diameter of 30 μm or more and 500 μm or less were continuous with one another via interfacial portions, and the number of aggregated particles of the acrylic polymer having a long diameter of 30 μm or more and 100 μm or less was 10 particles/mm$^2$ or less, the molded body had high flexibility after heat aging (had high heat aging resistance) as well as having favorable surface characteristics (had a low dynamic friction coefficient). This means that, the lower the dynamic friction coefficient of the polyvinyl chloride molded body is, the less sticky the polyvinyl chloride molded body is. A stereoscopic microscope SMZ-1500 manufactured by Nikon Corporation can be used as the optical microscope, for example.

In the present invention, the term "scale-like polyvinyl chloride particles" refers to scale-like objects in an image obtained by observing the cross section of the powder slush molded body extending in parallel with the thickness direction under an optical microscope using reflected light. In the present invention, the term "irregular" means that the sizes and/or shapes are not uniform. In the present invention, the term "long diameter of the polyvinyl chloride particle" refers to the longest straight line among straight lines that each connect random two random points on the outer circumference of a scale-like object in the image obtained by observing the cross section of the powder slush molded body extending in parallel with the thickness direction under an optical microscope using reflected light. The long diameter of the polyvinyl chloride particles is an average of the long diameters of twenty randomly-selected scale-like objects. In the present invention, the term "interfacial portions" refers to irregular ring-shaped objects that surround the scale-like objects in the image obtained by observing the cross section of the powder slush molded body extending in parallel with the thickness direction under an optical microscope using reflected light.

In the present invention, the term "aggregated particles of the acrylic polymer" refers to circular objects in the image obtained by observing the cross section of the powder slush molded body extending in parallel with the thickness direction under an optical microscope using reflected light. In the present invention, the term "long diameter of aggregated particles of the acrylic polymer" refers to the longest straight line among straight lines that each connect two random points on the outer circumference of a circular object in the image obtained by observing the cross section of the powder slush molded body extending in parallel with the thickness direction under an optical microscope using reflected light. In the present invention, the number of aggregated particles of the acrylic polymer (particles/mm$^2$) is determined by selecting twenty random positions (500 μm×500 μm) in the image obtained by observing the cross section of the powder slush molded body extending in parallel with the thickness direction under an optical microscope using reflected light, measuring the number of circular objects (aggregated particles of the acrylic polymer) at each position, and converting the average of the numbers obtained through the measurement into the number of particles per mm$^2$.

In the present invention, the term "polyvinyl chloride" refers to poly vinyl chloride having an average particle diameter of 50 μm or more and 500 μm or less, the average particle diameter being measured in accordance with JIS K 7369:2009. In the present invention, the term "polyvinyl chloride for a paste" refers to polyvinyl chloride having an average particle diameter of 0.01 μm or more and less than 50 μm, the average particle diameter being measured using a laser diffraction-scattering type particle size distribution measurement apparatus.

There is no particular limitation on the long diameter of the polyvinyl chloride particle as long as it is 30 μm or more and 500 μm or less, and for example, it is preferably 60 μm or more, and more preferably 90 μm or more. Moreover, the long diameter of the polyvinyl chloride particle is preferably 300 μm or less, and more preferably 200 μm or less, for example. More specifically, the average particle diameter of the polyvinyl chloride is preferably 60 μm or more and 300 μm or less, more preferably 90 μm or more and 300 μm or less, and even more preferably 90 μm or more and 200 μm or less, for example. When the long diameter of the polyvinyl chloride particle is within the above-described range, the adhesiveness of the polyvinyl chloride molded body to a urethane foam layer is improved.

From the viewpoint of improving flexibility after heat aging, the number of aggregated particles of the acrylic polymer is preferably 7 particles/mm$^2$ or less, more preferably 5 particles/mm$^2$ or less, even more preferably 3 particles/mm$^2$ or less, and even more preferably 0 particles/mm$^2$, which means that the aggregated particles of the acrylic polymer are not present.

It is preferable that, when the cross section of the powder slush molded body extending in parallel with the thickness direction is analyzed using laser Raman spectroscopy, a peak at a wave number of 600±5 cm$^{-1}$ originating from the acrylic polymer is present in the Raman spectrum of the interfacial portion. On the other hand, when the cross section of the powder slush molded body extending in parallel with the thickness direction is analyzed using laser Raman spectroscopy, the peak at a wave number of 600±5 cm$^{-1}$ originating from the acrylic polymer is not normally observed in the Raman spectrum of the inner portion of the polyvinyl chloride particle. However, if the peak at a wave number of 600±5 originating from the acrylic polymer is observed in the Raman spectrum of the inner portion of the polyvinyl chloride particle, the intensity of the peak at a wave number of 600±5 cm$^{-1}$ originating from the acrylic polymer observed in the Raman spectrum of the interfacial portion is higher than the intensity of the peak at a wave number of 600±5 cm$^{-1}$ originating from the acrylic polymer observed in the Raman spectrum of the inner portion of the polyvinyl chloride particle.

It is preferable that, when the cross section of the powder slush molded body extending in parallel with the thickness direction is analyzed using laser Raman spectroscopy, the intensity of a peak at a wave number of 666±5 cm$^{-1}$ originating from the plasticizer observed in the Raman spectrum of the inner portion of the polyvinyl chloride particle is higher than the intensity of the peak at a wave number of 666±5 cm$^{-1}$ originating from the plasticizer observed in the Raman spectrum of the interfacial portion. From the viewpoint of more efficiently suppressing stickiness (reducing the dynamic friction coefficient), the intensity of a peak at a wave number of 666±5 cm$^{-1}$ originating from the plasticizer observed in the Raman spectrum of the inner portion of the polyvinyl chloride particle is preferably 1.2 or more times, more preferably 1.4 or more times, and even more preferably 1.6 or more times, as high as the intensity of the peak at a wave number of 666±5 cm$^{-1}$ originating from the plasticizer observed in the Raman spectrum of the interfacial portion.

When the cross section of the powder slush molded body extending in parallel with the thickness direction is analyzed using laser Raman spectroscopy, the peak originating from the acrylic polymer is present in the Raman spectrum of the interfacial portion, and the intensity of the peak originating from the plasticizer in the Raman spectrum of the inner portion of the polyvinyl chloride particle is higher than the intensity of the peak originating from the plasticizer in the Raman spectrum of the interfacial portion. Therefore, it is inferred that a larger amount of the acrylic polymer is present in the interfacial portion and a larger amount of the plasticizer is present in the inner portion of the polyvinyl chloride particle. Therefore, it is inferred that the plasticizer is held inside the polyvinyl chloride particles surrounded by the interfacial portions containing the acrylic polymer in a larger amount and is thus less likely to move to the surfaces of the polyvinyl chloride particles, thus suppressing stickiness (reducing the dynamic friction coefficient) of the surface of the polyvinyl chloride molded body.

In the present invention, the intensity of a peak at a predetermined wave number in the Raman spectrum of the inner portion of the polyvinyl chloride particle is determined by analyzing, using laser Raman spectroscopy, four randomly-selected positions of one randomly-selected scale-like object in the image obtained by observing the cross section of the powder slush molded body extending in parallel with the thickness direction under an optical microscope using reflected light, and taking an average of the intensities at the predetermined wave number in the thus-obtained four Raman spectra. The intensity of a peak at a predetermined wave number in the Raman spectrum of the interfacial portion is determined by analyzing, using laser Raman spectroscopy, four randomly-selected positions of one randomly-selected ring-shaped object in the image obtained by observing the cross section of the powder slush molded body extending in parallel with the thickness direction under an optical microscope using reflected light, and taking an average of the intensities at the predetermined wave number in the thus-obtained four Raman spectra. In the present invention, the intensity of a peak at a predetermined wave number in a Raman spectrum is calculated by drawing a base line between two points at a wave number of 750 cm$^{-1}$ and a wave number of 575 cm$^{-1}$ and measuring the peak height at the predetermined wave number.

There is no particular limitation on the thickness of the interfacial portion, and for example, it is preferably 1 μm or more, more preferably 3 μm or more, and even more preferably 5 μm or more, from the viewpoint of further suppressing stickiness. The thickness of the interfacial portion is preferably 20 μm or less, more preferably 15 μm or less, and even more preferably 10 μm or less, from the viewpoint of further improving flexibility after heat aging, for example. In the present invention, the "thickness of the interfacial portion" is determined by selecting twenty random positions in the interfacial portions in the image obtained by observing the cross section of the powder slush molded body extending in parallel with the thickness direction under an optical microscope using reflected light, measuring the thickness of the interfacial portion at each position, and taking an average of the thus-obtained thicknesses.

There is no particular limitation on the average particle diameter of the polyvinyl chloride as long as it is 50 μm or more and 500 μm or less, and for example, it is preferably 100 μm or more, and more preferably 150 μm or more. The average particle diameter of the polyvinyl chloride is preferably 300 μm or less, and more preferably 200 pin or less, for example. More specifically, the average particle diameter of the polyvinyl chloride is preferably 100 µm or more and 300 µm or less, more preferably 100 µm or more and 200 µm or less, and even more preferably 150 µm or more and 200 µm or less, for example. When the average particle diameter of the polyvinyl chloride is within the above-described range, the fluidity of the powder of the polyvinyl chloride composition is improved, and the adhesiveness of a polyvinyl chloride molded body obtained by molding the polyvinyl chloride composition to a urethane foam layer is improved.

There is no particular limitation on the average degree of polymerization of the polyvinyl chloride as long as it is 1,350 or more. The average degree of polymerization is preferably 1,400 or more from the viewpoint of more easily forming the powder of the polyvinyl chloride composition. In addition, there is no particular limitation on the upper limit of the average degree of polymerization of the polyvinyl chloride, and it may be 3,800 or less, for example. The average degree of polymerization is preferably 3,500 or less, and more preferably 3,000 or less, from the viewpoint of improving the flexibility of a polyvinyl chloride molded body obtained by molding the polyvinyl chloride composition. More specifically, the average degree of polymerization of the polyvinyl chloride is preferably 1,350 or more and 3,800 or less, more preferably 1,350 or more and 3,500 or less, and even more preferably 1,400 or more and 3,000 or less. In the present invention, the average degree of polymerization of the polyvinyl chloride is measured in accordance with JIS K 6720-2:1999.

There is no particular limitation on the polyvinyl chloride, and a homopolymer of a vinyl chloride monomer and/or a copolymer of a vinyl chloride monomer and another copolymerizable monomer can be used. Examples of the other copolymerizable monomer include, but are not particularly limited to, ethylene, propylene, vinyl acetate, allyl chloride, allyl glycidyl ether, acrylic ester, and vinyl ether.

The polyvinyl chloride may be manufactured using any known polymerization method such as a suspension polymerization method or a bulk polymerization method, for example, but is preferably manufactured using a suspension polymerization method from the viewpoint of low cost and excellent thermal stability.

The polyvinyl chloride composition may contain the polyvinyl chloride in an amount of 30 mass % or more or 35 mass % or more, for example, but there is no particular limitation thereto. The poly-vinyl chloride composition may contain the polyvinyl chloride in an amount of 60 mass % or less, or 55 mass % or less, or 50 mass % or less, or 45 mass % or less. More specifically, the polyvinyl chloride composition may contain the polyvinyl chloride in an amount of 30 mass % or more and 60 mass % or less, or 35 mass % or more and 55 mass % or less, for example.

In the polyvinyl chloride composition, there is no particular limitation on the blend amount of the plasticizer as long as the blend amount is 110 parts by mass or more and 150 parts by mass or less with respect to 100 parts by mass of the polyvinyl chloride, and for example, it is preferably 115 parts by mass or more from the viewpoint of improving the heat aging resistance of the polyvinyl chloride molded body. The blend amount is preferably 145 parts by mass or less from the viewpoint of facilitating the formation of powder of the polyvinyl chloride composition. More specifically, the blend amount of the plasticizer is preferably 115 parts by mass or more and 150 parts by mass or less, and more preferably 115 parts by mass or more and 145 parts by mass or less, with respect to 100 parts by mass of the polyvinyl chloride.

There is no particular limitation on the plasticizer as long as a plasticizer for a polyvinyl chloride is used. For example, trimellitate-based plasticizers, phthalic acid-based plasticizers, pyromellitic acid-based plasticizers, epoxy-based plasticizers, polyester-based plasticizers, and aliphatic series-based plasticizers can be used. It is preferable to use trimellitate-based plasticizers from the viewpoint that the plasticizers are less likely to move and bleed out, and the heat aging resistance is further improved.

Examples of the trimellitate-based plasticizers include, but are not particularly limited to, tri(2-ethylhexyl) trimellitate, tri(n-octyl) trimellitate, triisooctyl trimellitate, triisodecyl trimellitate, triisononyl trimellitate, di(n-octyl) mono (n-decyl) trimellitate, and diisooctyl monoisodecyl trimellitate.

Examples of the phthalic acid-based plasticizers include, but are not particularly limited to, di(n-butyl) phthalate, di(n-octyl) phthalate, di(2-ethylhexyl) phthalate, diisooctyl phthalate, octyldecyl phthalate, diisodecyl phthalate, butylbenzyl phthalate, and di(2-ethylhexyl) isophthalate.

Examples of the pyromellitic acid-based plasticizers include, but are not particularly limited to, tetra(2-ethylhexyl) pyromellitate and tetra(n-octyl) pyromellitate. Examples of the epoxy-based plasticizers include, but are not particularly limited to, epoxidized soybean oil, epoxidized flaxseed oil, and epoxidized (2-ethyltheoxyl) tall oil fatty acid. Examples of the polyester-based plasticizers include, but are not particularly limited to, (1,3-butanediol) (2-ethylhexanol) adipate-based polyester, (1,6-hexanediol) (2-ethylhexanol) sebacate-based polyester, and (propylene glycol) (coconut oil fatty acid) adipate-based polyester.

The aliphatic series-based plasticizers may also be fatty acid ester-based plasticizers. Specifically, one or more selected from the group consisting of sebacates, azelates, and adipates can be used as the aliphatic series-based plasticizers, for example. More specifically, one or more selected from the group consisting of (2-ethylhexyl) sebacate (DOS), di(2-ethylhexyl) azelate (DOZ), di(2-ethylhexyl) adipate (DOA), diisodecyl adipate (DIDA), and diisononyl adipate (DINA) can be used as the aliphatic series-based plasticizers, for example.

The above-described plasticizers may be used alone or in combination of two or more.

There is no particular limitation on the blend amount of the acrylic polymer in the polyvinyl chloride composition, and for example, the blend amount is preferably 4 parts by mass or more, preferably 5 parts by mass or more, more preferably 7 parts by, mass or more, and even more preferably 9 parts by mass or more, with respect to 100 parts by mass of the polyvinyl chloride, from the viewpoint of further suppressing stickiness, that is, reducing the dynamic friction coefficient. The blend amount of the acrylic polymer is preferably 23 parts by mass or less, more preferably 22 parts by mass or less, and even more preferably 20 parts by mass or less, with respect to 100 parts by mass of the polyvinyl chloride, from the viewpoint of improving the flexibility and flexibility after heat aging. More specifically, the blend amount of the acrylic polymer is preferably 4 parts by mass or more and 23 parts by mass or less, more preferably 5 parts by mass or more and 22 parts by mass or less, and even more preferably 7 parts by mass or more and 20 parts by mass or less, with respect to 100 parts by mass of the polyvinyl chloride.

It is sufficient that the average particle diameter of the acrylic polymer is 0.01 µm or more and 10 µm or less from the viewpoint of improving the fluidity of the powder of the polyvinyl chloride composition, for example. The average particle diameter is preferably 0.1 µm or more, and more preferably 0.5 µm or more. The average particle diameter of the acrylic polymer is preferably 5 µm or less, and more preferably 2 µm or less, for example. More specifically, the average particle diameter of the acrylic polymer is preferably 0.1 µm or more and 5 µm or less, and more preferably 0.5 µm or more and 2 µm or less, for example. In the present invention, the average particle diameter of the acrylic polymer is measured using a dynamic light scattering type particle size distribution measurement apparatus.

The acrylic polymer contains a constitutional unit derived from (meth)acrylic ester in an amount of 50 mass % or more. In other words, the acrylic polymer is obtained through polymerization of a monomer mixture containing (meth)acrylic ester in an amount of 50 mass % or more. In the present invention, "(meth)acrylic acid" means acrylic acid and/or methacrylic acid. Moreover, "(meth)acrylic ester" means acrylic ester and/or methacrylic ester. The acrylic polymer preferably contains a constitutional unit derived from (meth)acrylic ester in an amount of 60 mass % or more, more preferably 70 mass % or more, even more preferably 80 mass % or more, and even more preferably 90 mass % or more, from the viewpoint of improving the surface characteristics and flexibility of the molded body.

Examples of the (meth)acrylic ester include a (meth)acrylic ester of an aliphatic alcohol and a (meth)acrylic ester of an aromatic alcohol. In the (meth)acrylic ester of an aliphatic alcohol, the aliphatic alcohol may be linear alcohol, or branched alcohol, or cyclic alcohol.

The (meth)acrylic ester includes at least one (meth)acrylic ester selected from the group consisting of a (methacrylic ester of an aliphatic alcohol having two or more carbon atoms and a (meth)acrylic ester of an aromatic alcohol, Therefore, the compatibility between the acrylic polymer and the plasticizer is improved, thus making it possible to suppress movement of the plasticizer to the surface of the polyvinyl chloride molded body. Examples of the (meth)acrylic ester of an aliphatic alcohol having two or more carbon atoms, namely (meth)acrylic esters including an alkyl group having two or more carbon atoms, include, but are not particularly limited to, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, n-heptyl (meth)acrylate, n-octyl (meth)acrylate, 2-ethylhexyl (meth)acrylate, nonyl (meth)acrylate, decyl (meth)aclylate, dodecyl (meth)acrylate, stearyl (meth)acrylate, cyclohexyl (meth)acrylate, and glycidyl (meth)acrylate. Examples of the (meth)acrylic ester of an aromatic alchohol include, but are not particularly limited to, phenyl (meth)acrylate and benzyl (meth)acrylate. These compounds may be used alone or in combination of two or more.

In the (meth)acrylic ester of an aliphatic alcohol having two or more carbon atoms, there is no particular limitation on the number of carbon atoms included in the aliphatic alcohol, but the number of carbon atoms is preferably 2 or more and 24 or less from the viewpoint that a molded body having favorable surface characteristics can be easily obtained, and more preferably 2 or more and 12 or less and even more preferably 2 or more and 8 or less from the viewpoint of facilitating emulsion polymerization or fine suspension polymerization. Moreover, the (meth)acrylic ester of an aliphatic alcohol having two or more carbon atoms is preferably at least one of a (meth)acrylic ester of an aliphatic alcohol having 4 carbon atoms selected from the group consisting of n-butyl (meth)acrylate, isobutyl (meth)acrylate, and tert-butyl (meth)acrylate, from the viewpoint of further improving the surface characteristics of the molded body, and more preferably n-butyl (meth)acylate and/or isobutyl (meth)acrylate. In addition, the (meth)acrylic ester of an aliphatic alcohol having two or more carbon atoms may include cyclohexyl (Meth)acrylate from the viewpoint of further improving the surface characteristics of the molded body. Furthermore, the (meth)acrylic ester of an aliphatic alcohol having two or more carbon atoms is preferably one or more selected from the group consisting of isobutyl (meth)acrylate and cyclohexyl (meth)acrylate from the viewpoint of excellent powder characteristics.

The (meth)acrylic ester may include a (meth)acrylic ester of an aliphatic alcohol having one carbon atom, such as methyl (meth)acrylate.

The acrylic polymer may contain a constitutional unit derived from another monomer in addition to the constitutional unit derived from the (meth)acrylic ester, Examples of the other monomer include carboxyl group-containing monomers, sulfonic group-containing monomers, carbonyl group-containing (meth)acrylates, hydroxyl group-containing (meth)acrylates, epoxy group-containing (meth)acrylates, and amino group-containing (meth)acrylates. Examples of the carboxyl group-containing monomers include methacrylic acid, acrylic acid, itaconic acid, crotonic acid, maleic acid, fumaric acid, 2-succinoloyloxyethyl methacrylate, 2-maleinoyloxyethyl methacrylate, 2-phthaloyloxyethyl methacrylate, and 2-hexahydrophthaloyloxyethyl methacrylate. Examples of the sulfonic group-containing monomers include allylsulfonic acid. Examples of the carbonyl group-containing (meth)acrylates include acetoacetoxyethyl (meth)acrylate. Examples of the hydroxyl group-containing (meth)acrylates include 2-hydroxyethyl (meth)acrylate and 2-hydroxypropyl (meth)acrylate. Examples of the epoxy group-containing (meth)acrylates include glycidyl (meth)acrylate. Examples of the amino group-containing (meth)acrylates include N-dimethylaminoethyl (meth)acrylate and N-diethylaminoethyl (meth)acrylate. Of these, methacrylic acid and acrylic acid are favorably used from the viewpoint of low cost and excellent polymerizability with the (meth)acrylic ester.

It is preferable that the acrylic polymer contains the constitutional unit derived from methyl (meth)acrylate in an amount of 40 mass % or more and 95 mass % or less, and the constitutional unit derived from at least one (meth)acrylic ester selected from the group consisting of n-butyl (meth)acrylate, isobutyl (meth)acrylate, and tert-butyl (meth)acrylate in an amount of 5 mass % or more and 60 mass % or less, from the viewpoint of improving the surface characteristics of a vinyl chloride molded body and improving flexibility after heat aging. It is more preferable that the acrylic polymer contains the constitutional unit derived from methyl (meth)acrylate in an amount of 50 mass % or more and 95 mass % or less, and the constitutional unit derived from at least one (meth)acrylic ester selected from the group consisting of n-butyl (meth)acrylate, isobutyl (meth)acrylate, and tert-butyl (meth)acrylate in an amount of 5 mass % or more and 50 mass % or less, from the viewpoint of improving the blocking properties of the polyvinyl chloride composition (powder), and it is even more preferable that the acrylic polymer contains the constitutional unit derived from methyl (methacrylate in an amount of 60 mass % or more and 95 mass % or less, and the constitutional unit derived from at least one (meth)acrylic ester selected from the group consisting of n-butyl (meth)acrylate, isobutyl (meth)acrylate, and tert-butyl (meth)acrylate in an amount of 5 mass % or more and 40 mass % or less. The acrylic polymer may contain a constitutional unit derived another monomer component in addition to the constitutional unit derived from methyl (meth)acrylate and the constitutional unit derived from the (meth)acrylic ester of the aliphatic alcohol having 4 carbon atoms. The content of the constitutional unit derived from the other monomer component in the acrylic polymer is preferably 5 mass % or less.

There is no particular limitation on the mass average molecular weight (Mw; also referred to as "weight average molecular weight") of the acrylic polymer, it may be 50,000 or more and 2,500,000 or less. The mass average molecular weight is preferably 150,000 or more, more preferably 300,000 or more, and even more preferably 350,000 or more, from the viewpoint of improving flexibility after heat aging. The mass average molecular weight is preferably 1,350,000 or less, more preferably 1,300,000 or less, and even more preferably 1,200,000 or less, from the viewpoint of improving flexibility after heat aging. More specifically, the mass average molecular weight of the acrylic polymer is preferably 150,000 or more and 1,350,000 or less, more preferably 300,000 or more and 1,300,000 or less, and even more preferably 350,000 or more and 1,200,000 or less. In the present invention, the mass average molecular weight of the acrylic polymer is measured using GPC (Gel Permeation Chromatography).

Although the acrylic polymer may be manufactured using any known polymerization method such as an emulsion polymerization method, a seeded emulsion polymerization method, a fine suspension polymerization method, or a seeded fine suspension polymerization method, it is preferable to use an emulsion polymerization method or fine suspension polymerization method from the viewpoint that such a method facilitates control of the molecular weight, particle structure, and particle diameter and is suitable for industrial production. In the emulsion polymerization method and the fine suspension polymerization method, a polymerization initiator, a surfactant (functioning as an emulsifying agent and/or a dispersing agent), a chain transfer agent, and the like can be used as appropriate.

There is no particular limitation on the polymerization initiator, but sodium persulfate, potassium persulfate, and ammonium persulfate can be used, for example.

There is no particular limitation on the surfactant, but anionic surfactants such as fatty acid salts, alkyl sulfosuccinates, alkyl sarcosinates, alkyl sulfates, and alkylbenzene sulfonates, nonionic surfactants such as polyoxyethylene alkyl ethers, polyoxyethylene fatty acid esters, and glycerin fatty acid esters, and cationic surfactants such as alkylamine salts can be used as appropriate, for example.

There is no particular limitation on the chain transfer agent, but favorable examples include alkyl mercaptans having 2 to 12 carbon atoms in their main chain, and mercapto alcohols. Examples of the alkyl mercaptans having 2 to 12 carbon atoms in their main chain include n-octyl mercaptan (also referred to as "1-octanethiol"), t-octyl mercaptan, n-dodecyl mercaptan, t-dodecyl mercaptan, and 2-ethylhexyl thioglycol. Examples of the mercapto alcohols include 2-mercaptoethanol.

The acrylic polymer may be in the form of particles having a uniform structure, or core-shell particles having a core-shell structure. When the acrylic polymer is in the form of core-shell particles, the mass ratio between the core portion and the shell portion may be within a range from 10:90 to 90:10, for example, but there is no particular limitation thereto.

When the acrylic polymer is in the form of particles having a uniform structure, the acrylic polymer can be produced through spray drying of a latex of a polymer obtained through polymerization of a monomer mixture (also referred to as "one-step polymerization"). When the acrylic polymer is in the form of core-shell particles, the acrylic polymer can be produced by forming a latex of a polymer (core portion) through polymerization of a monomer mixture, adding the additional monomer mixture to the thus-obtained latex and continuing to perform polymerization to form a latex of a polymer (having a core-shell structure), and then performing spray drying (also referred to as "two-step polymerization"). The polymerization of the core portion and/or the shell portion may be performed through two or more steps.

The polyvinyl chloride composition may further contain a polyvinyl chloride for a paste having an average particle diameter of 0.01 μm or more and less than 50 μm from the viewpoint of imparting flexibility, which is expressed as the tension characteristics under the application of 10% stress, for example. There is no particular limitation on the average particle diameter of the polyvinyl chloride for a paste, and for example, it is preferably 0.1 μm or more, and more preferably 0.5 μm or more. The average particle diameter of the polyvinyl chloride for a paste is preferably 20 μm or less, and more preferably 10 μm or less, for example. More specifically, the average particle diameter of the polyvinyl chloride for a paste is preferably 0.1 μm or more and 20 μm or less, and more preferably 0.5 μm or more and 10 μm or less, for example. When the average particle diameter of the polyvinyl chloride for a paste is within the above-described range, the fluidity of the powder of the polyvinyl chloride composition is improved. In the present invention, the average particle diameter of the polyvinyl chloride for a paste is measured using a laser diffraction-scattering type particle size distribution measurement apparatus such as a particle size distribution measurement apparatus (MICROTRAC/HRA (9320-X100) manufactured by Nikkiso Co., Ltd.).

There is 110 particular limitation on the average degree of polymerization of the polyvinyl chloride for a paste, and it may be 500 or more, or 800 or more, for example. There is no particular limitation on the upper limit of the average degree of polymerization of the polyvinyl chloride for a paste, and it may be 2,000 or less, or 1,500 or less, for example, More specifically, the average degree of polymerization of the polyvinyl chloride for a paste may be 500 or more and 2,000 or less, or 800 or more and 1,500 or less, for example. When the average degree of polymerization of the polyvinyl chloride for a paste is within the above-described range, the fluidity of the powder of the polyvinyl chloride composition is improved, and the moldability is also improved. In this specification, the average degree of polymerization of the polyvinyl chloride for a paste is measured in accordance with JIS K 6720-2:1999.

There is no particular limitation on the polyvinyl chloride for a paste, and for example, a homopolymer of a vinyl chloride monomer and/or a copolymer of a vinyl chloride monomer and another copolymerizable monomer can be used. Examples of the other copolymerizable monomer include, but are not limited to, ethylene, propylene, vinyl acetate, allyl chloride, allyl glycidyl ether, acrylic ester, and vinyl ether.

Although the polyvinyl chloride for a paste may be manufactured using any known polymerization method such as an emulsion polymerization method, a seeded emulsion polymerization method, a fine suspension polymerization method, or a seeded fine suspension polymerization method, it is preferable to manufacture the polyvinyl chloride for a paste using a fine suspension polymerization method from the viewpoint that fine particles can be easily formed.

In the polyvinyl chloride composition, the blend amount of the polyvinyl chloride for a paste is preferably 36 parts by mass or less, more preferably 30 parts by mass or less from the viewpoint of reducing the dynamic friction coefficient, and even more preferably 20 parts by mass or less, with respect to 100 parts by mass of the polyvinyl chloride. The lower limit of the blend amount of the polyvinyl chloride for a paste may be 3 parts by mass or more, or 5 parts by mass or more, from the viewpoint of improving the fusibility. When the blend amount of the polyvinyl chloride for a paste with respect to the polyvinyl chloride is within the above-described range, the fluidity of the powder of the polyvinyl chloride composition is improved.

In the polyvinyl chloride composition, the total blend amount of the acrylic polymer and the polyvinyl chloride for a paste is preferably 15 parts by mass or more and 40 parts by mass or less, more preferably 15 parts by mass or more and 35 parts by mass or less, and even more preferably 15 parts by mass or more and 30 parts by mass or less, with respect to 100 parts by mass of the polyvinyl chloride, from the viewpoint of reducing the dynamic friction coefficient of the polyvinyl chloride molded body and improving flexibility after heat aging.

The polyvinyl chloride composition may contain an acrylic modified polyorganosiloxane from the viewpoint of further reducing the dynamic friction coefficient of the molded body and improving the surface characteristics, and the blend amount of the acrylic modified polyorganosiloxane may be 0.5 parts by mass or more, or 1 part by mass or more, with respect to 100 parts by mass of the polyvinyl chloride, for example. The blend amount of the acrylic modified polyorganosiloxane is preferably 5 parts by mass or less, and more preferably 4 parts by mass or less, with respect to 100 parts by mass of the polyvinyl chloride, from the viewpoint of improving flexibility after heat aging, More specifically, the blend amount of the acrylic modified polyorganosiloxane may be 0.5 parts by mass or more and 5 parts by mass or less, or 1 part by mass or more and 5 parts by mass or less, or 1 part by mass or more and 4 parts by mass or less, with respect to 100 parts by mass of the polyvinyl chloride.

In the present invention, the content of silicone (polyorganosiloxane) in the acrylic modified polyorganosiloxane is 60 mass % or more. The acrylic modified polyorganosiloxane functions as a lubricant.

Acrylic modified polyorganosiloxane obtained through emulsion graft copolymerization of polyorganosiloxane and (meth)acrylic ester may be used as the acrylic modified polyorganosiloxane, for example.

Examples of the polyorganosiloxane include compounds represented by General Formula (I) below.

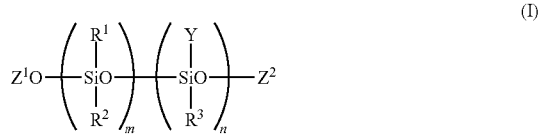

In General Formula (I), $R^1$, $R^2$, and $R^3$ are the same as or different from each other and are individually a hydrocarbon group or a halogenated hydrocarbon group having 1 to 20 carbon atoms. The hydrocarbon group may be an alkyl group or aryl group (e.g., an aryl group having 6 to 10 carbon atoms), for example. The halogenated hydrocarbon group may be a halogenated alkyl group or halogenated aryl group (e.g., a halogenated aryl group having 6 to 10 carbon atoms), for example.

In General Formula (I), Y is a radical reactive group, an SH group, an organic group including a radical reactive group, or an organic group including an SH group. The radical reactive group may be a vinyl group, an allyl group, a γ-acryloxypropyl group, a γ-methacryloxypropyl group, or a γ-mercaptopropyl group, for example.

In General Formula (I), $Z^1$ and $Z^2$ are the same as or different from each other and are individually a hydrogen atom, a lower alkyl group, or a triorganosilyl group. The lower alkyl group may be an alkyl group having 1 to 4 carbon atoms, for example. The triorganosilyl group may be a triorganosilyl group represented by General Formula (II) below, for example.

In General Formula (II), $R^4$ and $R^5$ are the same as or different from each other and are individually a hydrocarbon group or a halogenated hydrocarbon group having 1 to 20 carbon atoms. The hydrocarbon group may be an alkyl group or aryl group (e.g., an aryl group having 6 to 10 carbon atoms), for example. The halogenated hydrocarbon group may be a halogenated alkyl group or halogenated aryl group (e.g., a halogenated aryl group having 6 to 10 carbon atoms), for example.

In General Formula (II), $R^6$ is a hydrocarbon group having 1 to 20 carbon atoms, a halogenated hydrocarbon group, a radical reactive group, an SH group, an organic group including a radical organic group, or an organic group including an SH group. The hydrocarbon group having 1 to 20 carbon atoms may be an alkyl group or aryl group (e.g., an aryl group having 6 to 10 carbon atoms), for example. The halogenated hydrocarbon group may be a halogenated alkyl group or halogenated aryl group (e.g., a halogenated aryl group having 6 to 10 carbon atoms), for example. The radical reactive group may be a vinyl group, an allyl group, a γ-acryloxypropyl group, a γ-methacryloxypropyl group, or a γ-mercaptopropyl group, for example.

In General Formula m is a positive integer that is smaller than or equal to 10,000 (e.g., 500 to 8,000), and n is an integer that is greater than or equal to 1 (e.g., 1 to 500).

The (meth)acrylic ester may be (meth)acrylic ester represented by General Formula (III) below, for example.

In General Formula (III) $R^7$ is a hydrogen atom or a methyl group, and $R^8$ is an alkyl group (e.g., an alkyl group having 1 to 18 carbon atoms), an alkoxy-substituted alkyl group (e.g., an alkoxy-substituted alkyl group having 3 to 6 carbon atoms), a cycloalkyl group (e.g., a cycloalkyl group having 6 or 7 carbon atoms), or an aryl group (e.g., an aryl group having 6 to 10 carbon atoms).

The average particle diameter of the acrylic modified polyorganosiloxane may be 0.1 μm or more and 100 μm or less, or 1 μm or more and 100 μm or less, or 5 μm or more and 100 μm or less, or 0.1 μm or more and 80 μm or less, or 0.1 μm or more and 50 μm or less. In the present invention, the average particle diameter of the acrylic modified polyorganosiloxane is measured using a laser diffraction-scattering type particle size distribution measurement apparatus such as a particle size distribution measurement apparatus CROTRAC/HRA (9320-X100) manufactured by Nikkiso Co., Ltd.).

Commercially available products such as a silicone/acrylic hybrid resin (CHALINE (registered trademark)) manufactured by Nissin Chemical Industry Co., Ltd. can be used as the acrylic modified polyorganosiloxane, for example.

The polyvinyl chloride composition may further contain resin compounding agents such as a stabilizer, a coloring agent, an antioxidant, a filler, and an ultraviolet absorber as appropriate. In addition, the polyvinyl chloride composition for powder molding may also contain a lubricant other than acrylic modified polyorganosiloxane as appropriate.

Epoxy-based stabilizers, barium-based stabilizers, calcium-based stabilizers, tin-based stabilizers, zinc-based stabilizers, hindered amine-based light stabilizers, and composite stabilizers such as calcium-zinc-based (Ca—Zn-based) stabilizers and barium-zinc-based (Ba—Zn-based) stabilizers can also be used as the stabilizer, for example. The stabilizers may be used alone or in combination of two or more. The blend amount of the stabilizer is preferably 0.01 parts by mass or more and 8 parts by mass or less with respect to 100 parts by mass of the polyvinyl chloride.

Examples of the coloring agent include titanium oxide, zinc oxide, and carbon black. Commercially available pigments such as blue pigments or red pigments may also be used as the coloring agent. The coloring agents may be used alone or in combination of two or more.

The polyvinyl chloride composition can be manufactured by mixing the polyvinyl chloride, the acrylic polymer, and the plasticizer, and optionally the polyvinyl chloride for a paste, the acrylic modified polyorganosiloxane resin, and other resin compounding agents as appropriate. There is no particular limitation on the mixing method, and for example, a dry blending method is preferable. There is no particular limitation on the mixer, and for example, a super mixer or the like can be used.

The average particle diameter of the polyvinyl chloride composition is not particularly limited, and for example, it may be 50 μm or more, 60 μm or more, 100 μm or more, or 150 μm or more. The average particle diameter of the polyvinyl chloride composition is not particularly limited, and for example, it may be 500 μm or less, 300 μm or less, or 200 μm or less. More specifically, the average particle diameter of the polyvinyl chloride composition may be 50 μm or more and 500 μm or less, and for example, is preferably 100 μm or more and 300 μm or less, more preferably 100 μm or more and 200 μm or less, and even more preferably 150 μm or more and 200 μm or less, from the viewpoint of the fluidity of powder. The average particle diameter of the polyvinyl chloride composition is measured in accordance with JIS K 7369:2009.

There is no particular limitation on the adhesive power of the polyvinyl chloride composition, and it is preferably 250 gf/cm$^2$ (24.5 kPa) or less, more preferably 200 gf/cm$^2$ or less, even preferably 150 gf/cm$^2$ or less, even more preferably 100 gf/cm$^2$ or less, and even more preferably 50 gf/cm$^2$ or less, from the viewpoint of achieving excellent blocking properties. In the present invention, adhesive power is measured and calculated as described later.

The polyvinyl chloride molded body is obtained by molding the polyvinyl chloride composition through powder slush molding. When the cross section of the polyvinyl chloride molded body is observed, an interface between the polyvinyl chloride compositions for powder molding (polyvinyl chloride particles) used in powder slush molding is confirmed. Thus, it can be confirmed that the molded body is manufactured through powder slush molding, that is, the molded body is a powder slush molded body.

Although there is no particular limitation on the powder slush molding method, a method as described below can be used. That is, a slush molding machine including a powder box and a mold for slush molding (also referred to simply as "mold" hereinafter) is prepared, and the polyvinyl chloride composition is introduced into the powder box, while the mold is heated to a predetermined temperature (e.g., 230° C. or higher and 280° C. or lower). Next, the slush molding machine is inverted to bring the polyvinyl chloride composition into contact with the surface of the mold heated to the predetermined temperature, and is kept in this state for a predetermined period of time (e.g., 3 seconds or more and 15 seconds or less). Thereafter, the slush molding machine is inverted again, and the mold is cooled (to a temperature of 10° C. or higher and 60° C. or lower, for example). Then, a molded body is removed from the cooled mold.

There is no particular limitation on the shape of the polyvinyl chloride molded body, and for example, it may be formed in a sheet-like shape. When the polyvinyl chloride molded body has a sheet-like shape (in this case, the molded body is also referred to as "polyvinyl chloride sheet" hereinafter), there is no particular limitation on its thickness, and for example, it may have a thickness of 3.0 mm or less, or 2.0 mm or less, or 1.6 mm or less. In addition, it may have a thickness of 0.5 mm or more, or 0.6 mm or more, or 0.8 mm or more. More specifically, if the polyvinyl chloride molded body has a sheet-like shape, it may have a thickness of 0.5 mm or more and 3.0 mm or less, or 0.6 mm or more and 2.0 mm or less, or 0.8 mm or more and 1.6 mm or less.

When measured in accordance with JIS K 7125:1999, for example, the dynamic friction coefficient of the polyvinyl chloride molded body is preferably 0.75 or less, more preferably 0.73 or less, even more preferably 0.68 or less, even more preferably 0.62 or less, even more preferably 0.57 or less, and even more preferably 0.52 or less.

After performing heat aging (after heating at 125° C. for 200 hours), the tensile strength of the polyvinyl chloride molded body at an elongation percentage of 10% (also referred to as "10% tensile strength" hereinafter) is preferably 14.0 MPa or less, more preferably 13.5 MPa or less, even more preferably 13.0 MPa or less, even more preferably 12.5 MPa or less, and even more preferably 12.0 MPa or less, for example. In the present invention, the tensile test is performed in accordance with a modified method of JIS K 6251:2010 in which a distance between two chucks that hold a sample (polyvinyl chloride molded body) is employed instead of a distance between reference lines. A polyvinyl chloride molded body to be used for the tensile test after heat aging can be prepared as follows. That is, a resin laminate formed by laminating a polyvinyl chloride molded body and a polyurethane foam layer is heated at 125° C. for 200 hours, and then the polyvinyl chloride molded body is removed from the resin laminate and used for the tensile test.

The polyvinyl chloride molded body can be favorably used as a facing for a vehicle interior material such as that for an instrument panel, a door trim, a trunk trim, a seat, a pillar cover, a ceiling material, a rear tray, a console box, an air bag cover, an armrest, a headrest, a meter cover, or a crash pad, in a vehicle such as an automobile, but there is no particular limitation thereto.

The polyvinyl chloride molded body and a polyurethane foam layer (also referred to as "urethane foam molded body") can be laminated and used as a laminate Examples of the lamination method include, but are not particularly limited to, a method in which a polyvinyl chloride molded body and a polyurethane foam molded body are separately produced and then attached to each other through thermal fusion bonding or thermal adhesion, or using a known adhesive; and an isocyanate, and the like, which are raw materials of a polyurethane foam molded body, are reacted and polymerized on a polyvinyl chloride molded body, and polyurethane is foamed using a known method to form a laminate. The latter method is preferable because the process is simple, and the polyvinyl chloride molded body and the polyurethane foam molded body can be reliably adhered to each other even when laminates with various shapes are formed.

The laminate may include a polyurethane foam layer, a polyvinyl chloride molded body (also referred to as "polyvinyl chloride layer") laminated on one surface of the polyurethane foam layer, and another resin layer laminated on the other surface of the polyurethane foam layer. The other resin layer may be a layer of a polyolefin-based resin (e.g., polypropylene and/or a polyethylene-polypropylene copolymer) or ABS (Acrylonitrile-Butadiene-Styrene) resin, for example. Such a laminate can be manufactured by foaming polyurethane between the polyvinyl chloride layer and the other resin layer, for example.

The laminate can be favorably used as a vehicle interior material such as that for an instrument panel, a door trim, a trunk trim, a seat, a pillar cover, a ceiling material, a rear tray, a console box, an air bag cover, an armrest, a headrest, a meter cover, or a crash pad, in a vehicle such as an automobile, but there is no particular limitation thereto.

EXAMPLES

Hereinafter, the present invention will be described more specifically by use of examples. However, the present invention is not limited to the following examples.

Manufacturing Example 1 of Acrylic Polymer

Into a 2-L polymerization apparatus including a stirrer, a reflux condenser, a thermometer, a nitrogen gas introduction pipe, and a feed pump, 380 g of deionized water was poured, and was heated under stirring in a nitrogen atmosphere. When the internal temperature reached 80° C., 23.5 g of 2% sodium persulfate was added thereto. Next, a monomer emulsion liquid produced by mixing and stirring 420.0 g of methyl methacrylate (MMA), 280.0 g of isobutyl methacrylate (iBMA), 2.5 g of sodium di-(2-ethylhexyl) sulfosuccinate, 0.05 g of 1-octanethiol, and 230.0 g of deionized water was dripped thereinto for 2 hours, and the resulting mixture was stirred for another 2 hours at 80° C. after the dripping was finished. A latex was thus obtained. The thus-obtained latex was cooled to room temperature, and then an acrylic polymer A1 was manufactured by performing spray drying using a spray dryer (L-12-LS, manufactured by Ohkawara Kakohki Co., Ltd.) under conditions where the inlet temperature was 130° C., the outlet temperature was 60° C., and the atomizer disk rotation speed was 20,000 rpm.

Manufacturing Example 2 of Acrylic Polymer

An acrylic polymer A2 was manufactured in the same manner as in Manufacturing Example 1, except that the amounts of methyl methacrylate (MMA) and isobutyl methacrylate (iBMA) in the monomer emulsion liquid were changed to 525.0 g and 175.0 g, respectively.

Manufacturing Example 3 of Acrylic Polymer

An acrylic polymer A3 was manufactured in the same manner as in Manufacturing Example 1, except that the amounts of methyl methacrylate (MMA) and isobutyl methacrylate (iBMA) in the monomer emulsion liquid were changed to 560.0 g and 140.0 g, respectively.

Manufacturing Example 4 of Acrylic Polymer

An acrylic polymer A4 was manufactured in the same manner as in Manufacturing Example 1, except that the amounts of methyl methacrylate (MMA) and isobutyl methacrylate (iBMA) in the monomer emulsion liquid were changed to 595.0 g and 105.0 g, respectively.

Manufacturing Example 5 of Acrylic Polymer

An acrylic polymer A5 was manufactured in the same manner as in Manufacturing Example 1, except that the amounts of methyl methacrylate (MIMA) and isobutyl methacrylate (iBMA) in the monomer emulsion liquid were changed to 630.0 g and 70.0 g, respectively.

Manufacturing Example 6 of Acrylic Polymer

An acrylic polymer A6 was manufactured in the same manner as in Manufacturing Example 1, except that the amounts of methyl methacrylate (MMA) and isobutyl methacrylate (iBMA) in the monomer emulsion liquid were changed to 665.0 g and 35.0 g, respectively.

Manufacturing Example 7 of Acrylic Polymer

An acrylic polymer A7 was manufactured in the same manner as in Manufacturing Example 1, except that the amounts of methyl methacrylate (MMA) and isobutyl methacrylate (iBMA) in the monomer emulsion liquid were changed to 280.0 g and 420.0 g, respectively.

Manufacturing Example 8 of Acrylic Polymer

An acrylic polymer A8 was manufactured in the same manner as in Manufacturing Example 1, except that the amount of methyl methacrylate (MMA) in the monomer emulsion liquid was changed to 700.0 g and isobutyl methacrylate (iBMA) was not used.

Manufacturing Example 9 of Acrylic Polymer

Into a 2-L polymerization apparatus including a stirrer, a reflux condenser, a thermometer, a nitrogen gas introduction pipe, and a feed pump, 380 g of deionized water was poured, and was heated under stirring in a nitrogen atmosphere. When the internal temperature reached 80° C., 17.5 g of 2% sodium persulfate was added thereto. Next, a monomer emulsion liquid (for a core portion) produced by mixing and stirring 200.0 g of methyl methacrylate (MMA), 150.0 g of n-butyl methacrylate (nBMA), 1.2 g of sodium di-(2-ethylhexyl) sulfosuccinate, and 120.0 g of deionized water was dripped thereinto for 1 hours, and the resulting mixture was stirred for another 80 minutes at 80° C. after the dripping was finished. A latex was thus obtained. Into the thus-obtained latex, 6.0 g of 2% sodium persulfate was added, and a monomer emulsion liquid (for a shell portion) produced by mixing and stirring 227.0 g of methyl methacrylate (MMA), 123.0 g of isobutyl methacrylate (iBMA), 1.4 g of sodium di-(2-ethylhexyl) sulfosuccinate, 0.05 g of 1-octanethiol, and 130.0 g of deionized water was dripped thereinto for 45 minutes, and the resulting mixture was stirred for another 30 minutes at 80° C. after the dripping was finished. A two-step polymerization latex was thus obtained. The thus-obtained two-step polymerization latex was dried in the same manner as in Example 1, and an acrylic polymer B1 was thus obtained. In the acrylic polymer B1, the mass ratio between the core portion and the shell portion was 50:50.

Manufacturing Example 10 of Acrylic Polymer

An acrylic polymer C1 was manufactured in the same manner as in Manufacturing Example 1, except that 1-octanethiol was not added to the monomer emulsion liquid.

Manufacturing Example 11 of Acrylic Polymer

An acrylic polymer C2 was manufactured in the same manner as in Manufacturing Example 1, except that the amount of 1-octanethiol in the monomer emulsion liquid was increased to 0.25 g.

Manufacturing Example 12 of Acrylic Polymer

An acrylic polymer D1 was manufactured in the same manner as in Manufacturing Example 1, except that isobutyl methacrylate (iBMA) used in the monomer emulsion liquid was changed to n-butyl methacrylate (nBMA).

Manufacturing Example 13 of Acrylic Polymer

An acrylic polymer E1 was manufactured in the same manner as in Manufacturing Example 5, except that 70.0 g of isobutyl methacrylate (iBMA) in the monomer emulsion liquid was changed to 70.0 g of dodecyl methacrylate (DMA).

Manufacturing Example 14 of Acrylic Polymer

An acrylic polymer E2 was manufactured in the same manner as in Manufacturing Example 5, except that 70.0 g of isobutyl methacrylate (iBMA) in the monomer emulsion liquid was changed to 70.0 g of cyclohexyl methacrylate (CHMA).

The average particle diameters of the acrylic polymers A1 to A8, B1, C1 to C2, D1, E1, and E2 were measured using a dynamic light scattering type particle size distribution measurement apparatus ("Nanotrac Wave-EX150" manufactured by MicrotracBEL Corp.). The mass average molecular weights (Mw) were measured using a high-speed GPC apparatus ("HCL-8220" manufactured by TOSOH Corporation; Columns: "TSK guard column HZ-H" and "TSK gel Super HZM-H" manufactured by TOSOH Corporation; GPC solvent: THF). Table 1 below shows the results.

TABLE 1

| Acrylic polymer | Monomer species | Polymerization method | Average particle diameter (μm) | Mw |
|---|---|---|---|---|
| A1 | MMA/iBMA | One step | 0.80 | 520,000 |
| A2 | MMA/iBMA | One step | 0.89 | 480,000 |
| A3 | MMA/iBMA | One step | 0.82 | 450,000 |
| A4 | MMA/iBMA | One step | 0.83 | 460,000 |
| A5 | MMA/iBMA | One step | 0.84 | 420,000 |
| A6 | MMA/iBMA | One step | 0.87 | 410,000 |
| A7 | MMA/iBMA | One step | 0.87 | 820,000 |
| A8 | MMA | One step | 0.82 | 260,000 |
| B1 | Core portion: MMA/nBMA Shell portion: MMA/iBMA | Two steps | 0.76 | 450,000 |
| C1 | MMA/iBMA | One step | 0.82 | 1,300,000 |
| C2 | MMA/iBMA | One step | 0.79 | 320,000 |
| D1 | MMA/nBMA | One step | 0.83 | 580,000 |
| E1 | MMA/DMA | One step | 0.63 | 310,000 |
| E2 | MMA/CHMA | One step | 0.69 | 360,000 |

Example 1

Manufacturing of Polyvinyl Chloride Composition

Into a 100-L super mixer (manufactured by KAWATA MPG. Co., Ltd.), 100 parts by mass of the polyvinyl chloride (vinyl chloride homopolymer with an average degree of polymerization of 1,700 and an average particle diameter of 152 μm; "KS-1700" manufactured by KANEKA Corporation), 120 parts by mass of a plasticizer (tri(n-octyl) trimellitate; "C-8L" manufactured by ADEKA Corporation), 5 parts by mass of zinc stearate as a stabilizer, 1.5 parts by mass of sodium perchlorate as a stabilizer, 0.3 parts by mass of a hindered amine-based light stabilizer (HALS) as a stabilizer, 5 parts by mass of epoxidized soybean oil as a stabilizer, and 3 parts by mass of a pigment (black) were introduced and mixed at 70° C. Next, the thus-obtained mixture was dried and then cooled to a temperature of 50° C. or lower. Then, 20 parts by mass of the acrylic polymer A1 was added thereto and mixed to produce a polyvinyl chloride composition (powder).

Manufacturing of Polyvinyl Chloride Molded Body

Powder slush molding using the polyvinyl chloride composition obtained as described above was performed using a box-type slush molding machine including a mold for slush molding provided with an embossed flat plate (with a length of 22 cm and a width of 31 cm) and a powder box (with a length of 22 cm, a width of 31 cm, and a depth of 16 cm). Specifically, first, 2 kg of the polyvinyl chloride composition was introduced into the powder box, and the mold for slush molding heated to 280° C. was set in the slush molding machine. Next, when the temperature of the mold reached 260° C., the slush molding machine was inverted and the polyvinyl chloride composition was held in the mold for about 10 to 12 seconds such that a polyvinyl chloride sheet (also referred to as "PVC sheet") had a thickness of 1.0 mm. Then, the slush molding machine was inverted. After 60 seconds, the mold was cooled to 50° C. using cooling water. Next, the PVC sheet was removed from the mold, and a polyvinyl chloride molded body was thus obtained.

Manufacturing of Laminate

The PVC sheet obtained as described above was placed on the bottom of a mold for foaming (190 mm×240 mm×11 mm). Next, a raw material solution prepared by mixing 36 g of liquid A containing 4,4'-diphenylmethane-diisocyanate and 78 g of liquid B containing polyether polyol (containing 1.0 mass % of triethylenediamine and 1.6 mass % of water)

was poured onto the PVC sheet, and the 1.5 mold was sealed. After a predetermined period of time, a laminate including the PVC sheet (facing) with a thickness of about 1 mm and a polyurethane foam layer (backing material) with a thickness of about 9 mm laminated on the PVC sheet was collected from the mold.

Example 2

A polyvinyl chloride composition, a polyvinyl chloride molded body, and a laminate were produced in the same manner as in Example 1, except that 10 parts by mass of the acrylic polymer A1, and 10 parts by mass of the polyvinyl chloride for a paste (vinyl chloride homopolymer with an average degree of polymerization of 1,300 and an average particle diameter of 10 μm; "PSM-31" manufactured by KANEKA Corporation) were used instead of 20 parts by mass of the acrylic polymer A1.

Example 3

A polyvinyl chloride composition, a polyvinyl chloride molded body, and a laminate were produced in the same manner as in Example 1, except that 2 parts by mass of acrylic modified polysiloxane silicone/acrylic hybrid resin with an average particle diameter of 30 μm in which the silicone content is 80 mass % and the acrylic content is 20 mass %; "CHALINE (registered trademark) R-181S" manufactured by Nissin Chemical Industry Co., Ltd.) was further added to the mixture and mixed at 70° C.

Examples 4 to 7

Polyvinyl chloride compositions, polyvinyl chloride molded bodies, and laminates were produced in the same manner as in Example 3, except that the acrylic polymer A1 and the polyvinyl chloride for a paste ("PSM-31" manufactured by KANEKA Corporation) in the blend amounts shown in Table 2 below were used instead of 20 parts by mass of the acrylic polymer A1.

Example 8

A polyvinyl chloride composition, a polyvinyl chloride molded body, and a laminate were produced in the same manner as in Example 3, except that the acrylic polymer A1, the polyvinyl chloride for a paste ("PSM-31" manufactured by KANEKA Corporation), and the polyvinyl chloride for a paste (vinyl chloride homopolymer with an average degree of polymerization of 1,000 and an average particle diameter of 10 μm; "PSL-31" manufactured by KANEKA Corporation) in the blend amounts shown in Table 2 below were used instead of 20 parts by mass of the acrylic polymer A1

Examples 9 to 12, 15 to 20

Polyvinyl chloride compositions, polyvinyl chloride molded bodies, and laminates were produced in the same manner as in Example 6, except that acrylic polymers shown in Table 2 to Table 4 below were used instead of the acrylic polymer A1.

Example 13

A polyvinyl chloride composition, a polyvinyl chloride molded body, and a laminate were produced in the same manner as in Example 8, except that a vinyl chloride homopolymer (with an average degree of polymerization of 1,400 and an average particle diameter of 159 μm; "S1004D" manufactured by KANEKA Corporation) was used as the polyvinyl chloride and the blend amount of the plasticizer was changed to 110 parts by mass.

Example 14

A polyvinyl chloride composition, a polyvinyl chloride molded body, and a laminate were produced in the same manner as in Example 1, except that 7 parts by mass of the acrylic polymer A1, and 13 parts by mass of the polyvinyl chloride for a paste ("PSM-31" manufactured by EANEKA Corporation) were used instead of 20 parts by mass of the acrylic polymer A1.

Example 21

A polyvinyl chloride composition for powder molding, a polyvinyl chloride molded body, and a laminate were produced in the same manner as in Example 12, except that 125 parts by mass of the plasticizer was used.

Examples 22 to 23

Polyvinyl chloride compositions for powder molding, polyvinyl chloride molded bodies, and laminates were produced in the same manner as in Example 21, except that acrylic polymers shown in Table 4 below were used instead of the acrylic polymer A5.

Comparative Example 1

A polyvinyl chloride composition, a polyvinyl chloride molded body, and a laminate were produced in the same manner as in Example 3, except that the acrylic polymer A8 was used instead of the acrylic polymer A1.

Comparative Example 2

A polyvinyl chloride composition, a polyvinyl chloride molded body, and a laminate were produced in the same manner as in Example 1, except that the polyvinyl chloride for a paste ("PSM-31" manufactured by KANEKA Corporation) was used instead of the acrylic polymer A1.

Comparative Example 3

A polyvinyl chloride composition, a polyvinyl chloride molded body, and a laminate were produced in the same manner as in Example 4, except that the blend amount of the acrylic polymer A1 was changed to 3 parts by mass, and the blend amount of the polyvinyl chloride for a paste ("PSM-31" manufactured by KANEKA Corporation) was changed to 17 parts by mass.

Comparative Example 4

A polyvinyl chloride composition, a polyvinyl chloride molded body, and a laminate were produced in the same manner as in Example 3, except that the polyvinyl chloride for a paste ("PSM-31" manufactured by KANEKA Corporation) was used instead of the acrylic polymer A1.

Comparative Example 5

A polyvinyl chloride composition, a polyvinyl chloride molded body, and a laminate were produced in the same manner as in Example 3, except that the polyvinyl chloride for a paste ("PSL-31" manufactured by KAINEKA Corporation) was used instead of the acrylic polymer A1.

Comparative Example 6

A polyvinyl chloride composition, a polyvinyl chloride molded body, and a laminate were produced in the same manner as in Example 13, except that the blend amount of the plasticizer was changed to 100 parts by mass.

Comparative Example 7

A polyvinyl chloride composition for powder molding, a polyvinyl chloride molded body, and a laminate were produced in the same manner as in Example 21, except that the acrylic polymer A8 was used instead of the acrylic polymer A5.

The cross sections of the polyvinyl chloride molded body of Example 1 and the polyvinyl chloride molded body of Comparative Example 1 were observed under an optical microscope as described below, and Raman analysis was performed using laser Raman spectroscopy. FIGS. 1 to 7 shows the results.

Method of Analyzing Cross Section

A razor blade was used to produce a section (having a thickness of about 1,000 μm) of the powder slush molded body including a cross section extending in parallel with the thickness direction, and the cross section was observed under an optical microscope and subjected to Raman analysis. The following describes the used apparatuses and the conditions.

Optical microscope
  Apparatus: SMZ-1500 manufactured by Nikon Corporation
  Observation condition: Observation mode—Reflection
Microscopic Raman spectroscopic analyzer (μ Raman)
  Apparatus: LabRam HR-800 manufactured by HORIBAJY
  Analysis conditions
  Objective lens: ×100
  Beam diameter: 1 μm
  Filter Measurement of sample: D0.6 (¼ of total energy Measurement of standard sample: None
  Cumulative time Measurement of sample: 10 seconds Measurement of standard sample: 20 seconds
  Cumulative frequency Measurement of sample: 10 times Measurement of standard sample: 5 times
  Light source: He—Ne laser 633 nm FIG. 1 is an image of a cross section of the powder slush molded body of Example 1 extending in parallel with the thickness direction observed under an optical microscope using reflected light. FIG. 1(a) is a 20-fold magnified image, and FIG. 1(b) is a partially enlarged view of FIG. 1(a). As is clear from FIG. 1, when the cross section of the powder slush molded body of Example 1 extending in parallel with the thickness direction was observed under an optical microscope using reflected light, irregular scale-like polyvinyl chloride particles (black scale-like objects) were continuous with one another via interfacial portions (white ring-shaped objects). Although not shown, when the cross sections of the powder slush molded bodies of Examples 2 to 23 extending in parallel with the thickness direction were observed under an optical microscope using reflected light, irregular scale-like polyvinyl chloride particles (black scale-like objects) were continuous with one another via interfacial portions (white ring-shaped objects).

The long diameter of the polyvinyl chloride particle was 147 μm, the long diameter being calculated by selecting twenty random scale-like objects in the image obtained by observing the cross section of the powder slush molded body of Example 1 extending in parallel with the thickness direction under an optical microscope using reflected light, measuring the length of the longest straight line among straight lines that each connect two random points on the outer circumference of each of the scale-like objects, and taking an average of the thus-obtained lengths. Moreover, the thickness of the interfacial portion was 11 μm, the thickness being calculated by selecting twenty random positions in the image obtained by observing the cross section of the powder slush molded body of Example 1 extending in parallel with the thickness direction under an optical microscope using reflected light, measuring the thickness of the interfacial portion at each of the positions, and taking an average of the thus-obtained thicknesses. As is clear from FIG. 1, white circular objects, namely the aggregated particles of the acrylic polymer, were not present on the cross section of the powder slush molded body of Example 1 extending in parallel with the thickness direction. When twenty random positions were selected in the image (not shown) obtained by observing the cross section of the powder slush molded body of Example 14, which had a relatively high dynamic friction coefficient, extending in parallel with the thickness direction under an optical microscope using reflected light in the same manner as in Example 1, and the number of aggregated particles of the acrylic polymer at each of the positions and the long diameters of the aggregated particles of the acrylic polymer were measured, the number of aggregated particles of the acrylic polymer having a long diameter of 40 μm or more and 80 μm or less was two particles/mm$^2$ (this value was determined by converting the average of the numbers of aggregated particles of the acrylic polymer present at the twenty positions into the number of particles per mm$^2$). Moreover, when twenty random positions were selected in the image (not shown) obtained by observing the cross section of the powder slush molded body of Example 16, which had a relatively high dynamic friction coefficient, extending in parallel with the thickness direction under an optical microscope using reflected light in the same manner as in Example 1, and the number of aggregated particles of the acrylic polymer at each of the positions and the long diameters of the aggregated particles of the acrylic polymer were measured, the number of aggregated particles of the acrylic polymer having a long diameter of 40 μm or more and 58 μm or less was seven particles/mm$^2$ (this value was determined by converting the average of the numbers of aggregated particles of the acrylic polymer present at the twenty positions into the number of particles per mm$^2$).

In the image obtained by observing the cross section of the powder slush molded body of Example 1 extending in parallel with the thickness direction under an optical microscope using reflected light, the scale-like objects were black due to the polyvinyl chloride particles containing a black pigment, and the ring-shaped objects (interfacial portions) were white due to the acrylic polymer containing no pigments. If the polyvinyl chloride particles contain no pigments, and the acrylic polymer contains a black pigment, the scale-like objects will be white and the ring-shaped objects (interfacial portions) will be black in the image obtained by observing the cross section of a powder slush molded body extending in parallel with the thickness direction under an optical microscope using reflected light. If both the polyvinyl chloride particles and the acrylic polymer contain a black pigment, or neither the polyvinyl chloride particles nor the acrylic polymer contains a pigment, or the polyvinyl chloride particles and the acrylic polymer contain pigments of different colors, adjustment can be made such that the scale-like objects (polyvinyl chloride particles) and the ring-shaped objects (interfacial portions) have different colors (black and white) by performing image processing for changing the colors to black and white on the image obtained by observing the cross section of a powder slush molded body extending in parallel with the thickness direction under an optical microscope using reflected light. The circular objects (aggregated particles of the acrylic polymer) and the ring-shaped objects will have the same color in the image obtained by observing the cross section of a powder slush molded body extending in parallel with the thickness direction under an optical microscope using reflected light.

Figure 2:
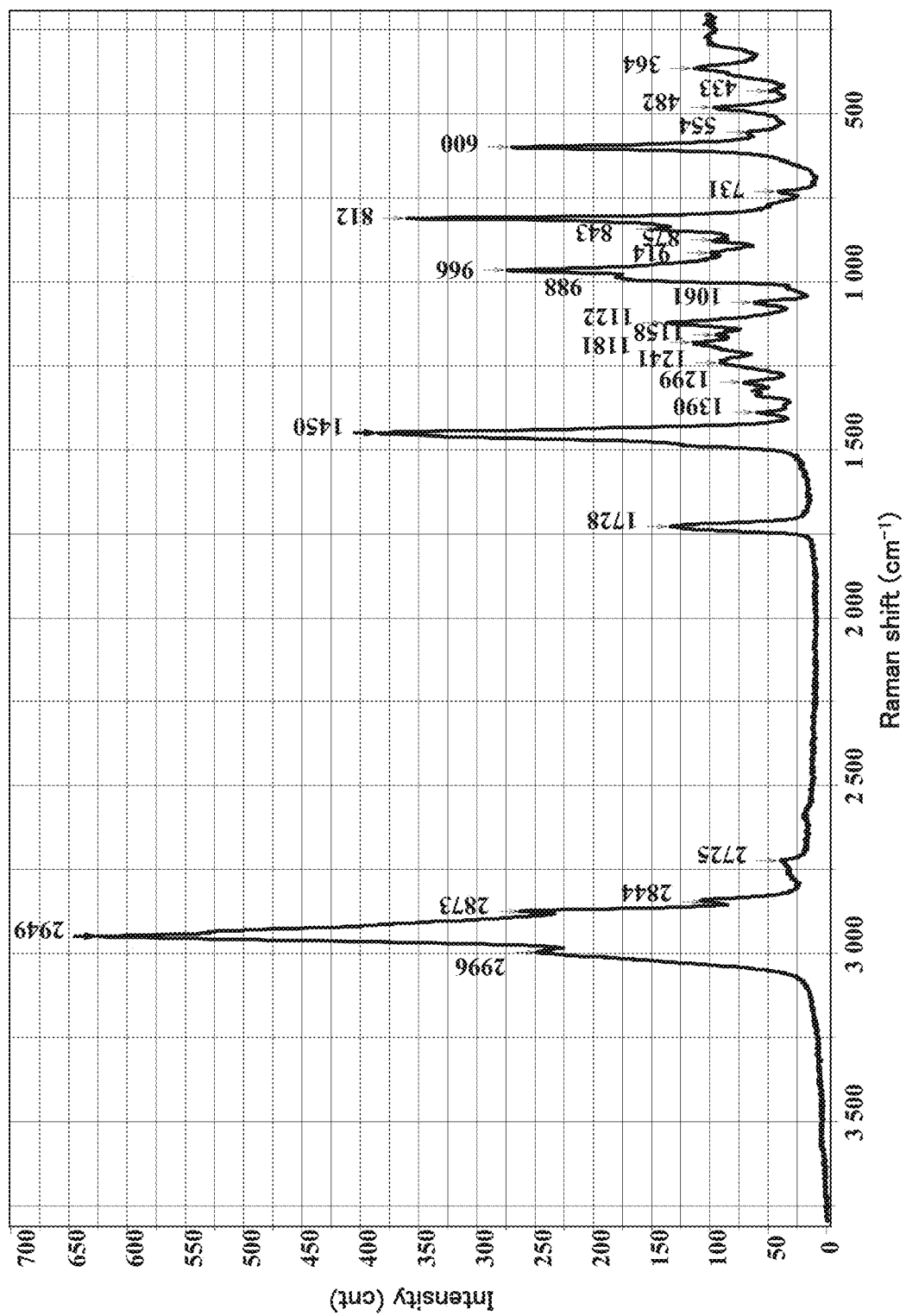
FIG. 2 is a Raman spectrum in a wave number range between 200 cm$^{-1}$ and 3,800 cm$^{-1}$ obtained by analyzing an acrylic polymer A1 using laser Raman spectroscopy.
Figure 3:
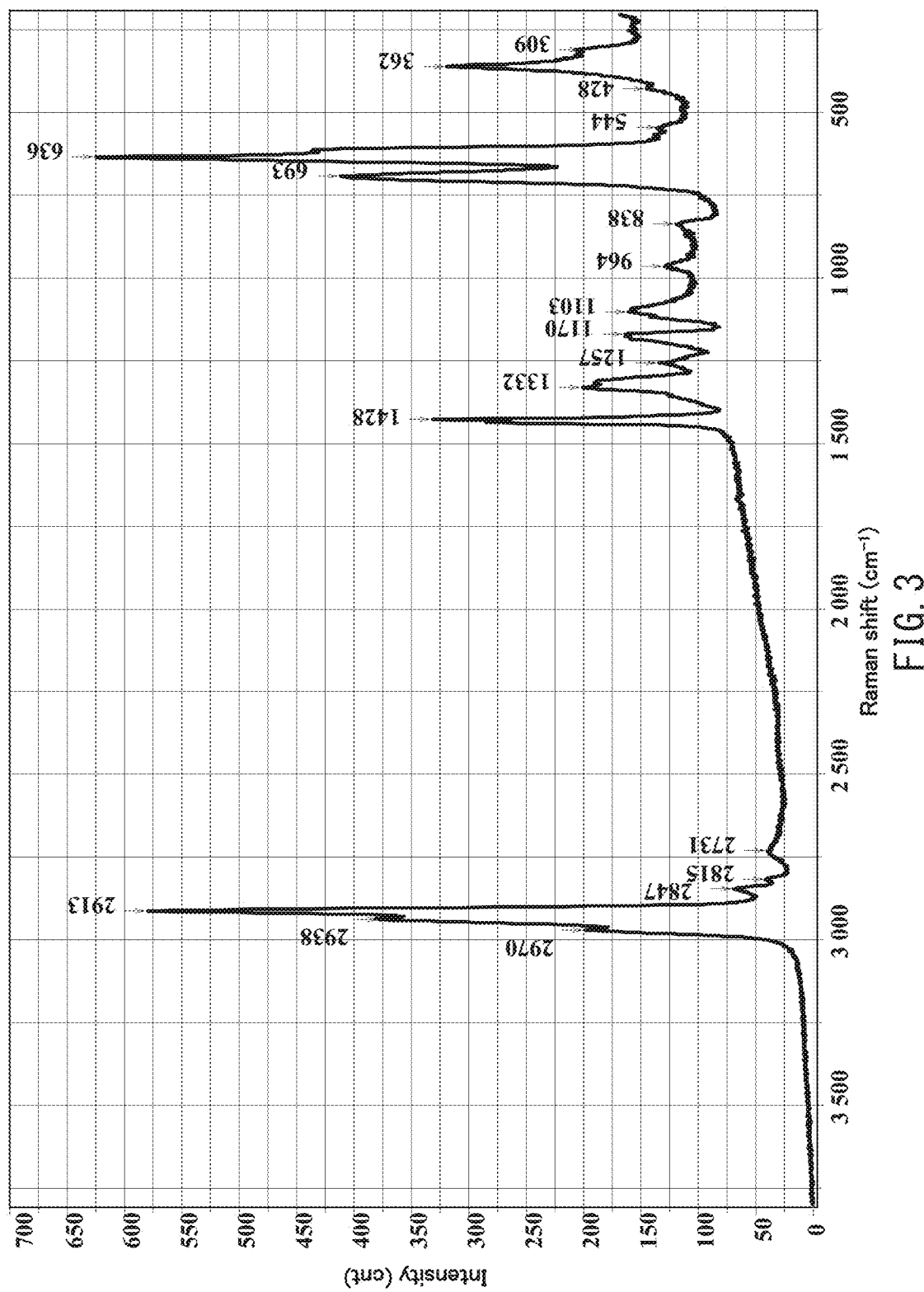
FIG. 3 is a Raman spectrum in a wave number range between 200 cm$^{-1}$ and 3,800 cm$^{-1}$ obtained by analyzing a polyvinyl chloride for a paste (vinyl chloride homopolymer with an average degree of polymerization of 1,300 and an average particle diameter of 10 μm) using laser Raman spectroscopy
Figure 4:
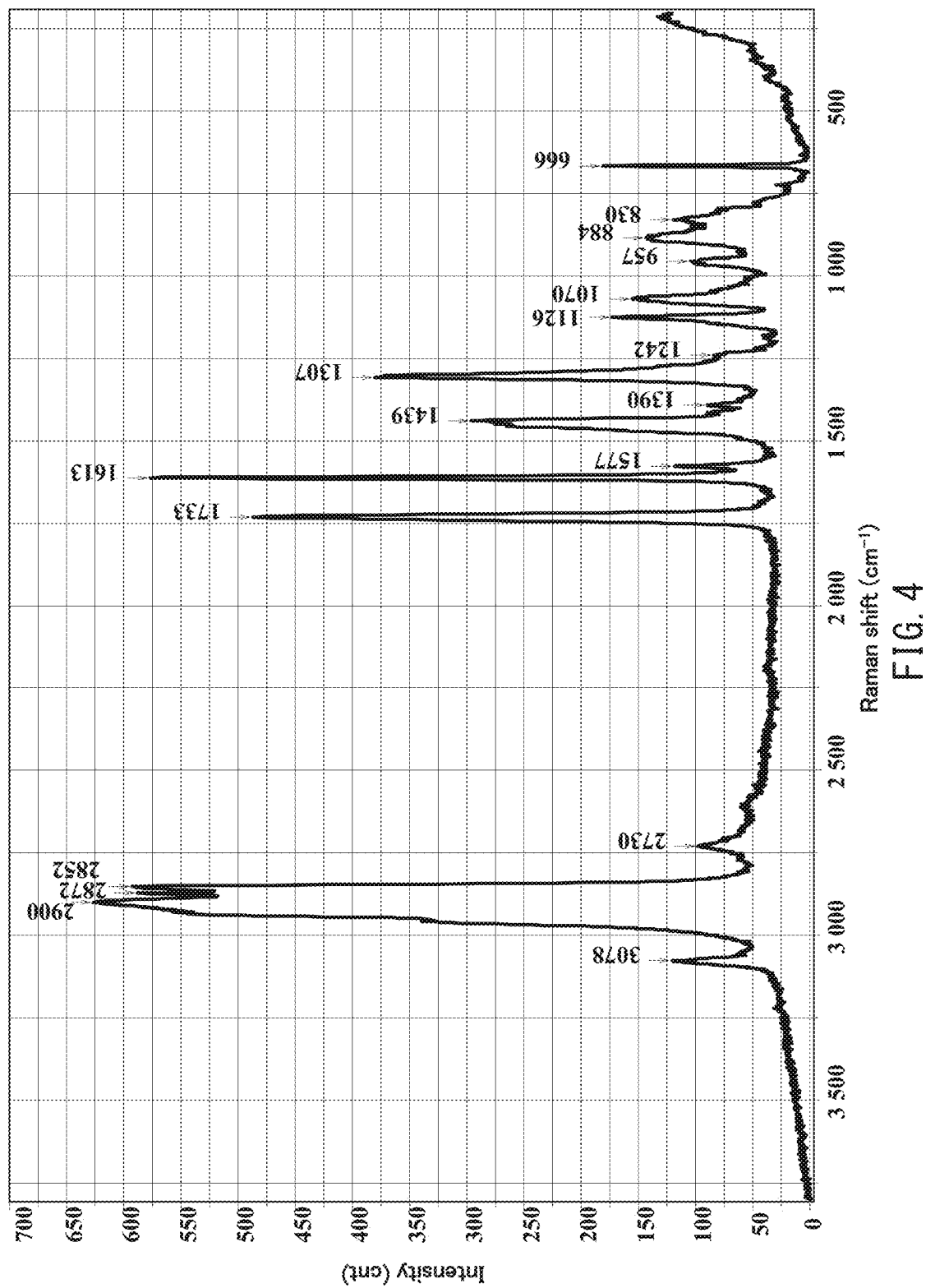
FIG. 4 is a Raman spectrum in a wave number range between 200 cm$^{-1}$ and 3,800 obtained by analyzing a plasticizer (tri(n-octyl) trimellitate) using laser Raman spectroscopy
Figure 5:
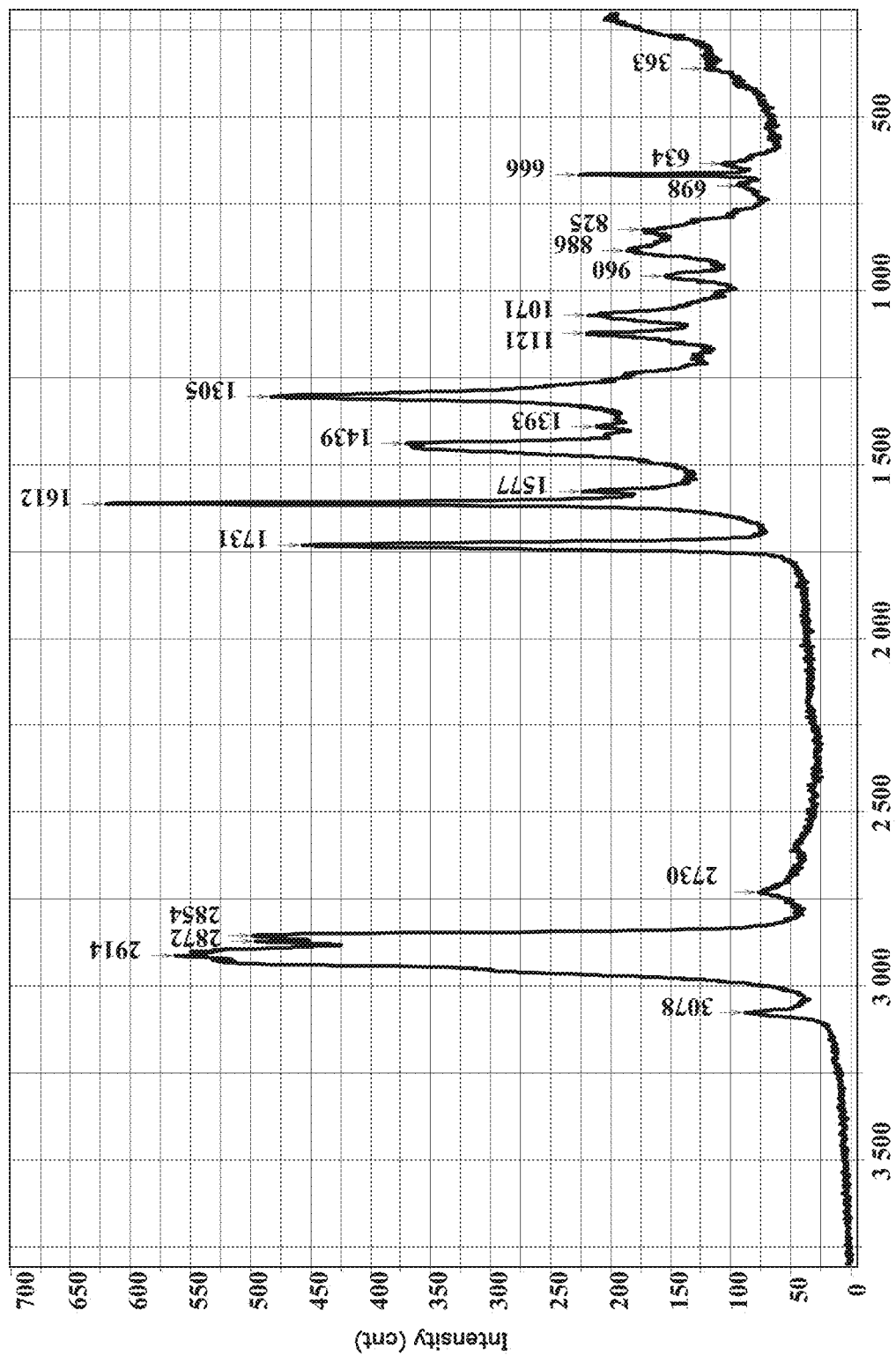
FIG. 5 is a Raman spectrum in a wave number range between 200 cm$^{-1}$ and 3,800 cm$^{-1}$ obtained by analyzing the inner portion of a polyvinyl chloride particle on the cross section of the powder slush molded body of Example 1 extending in parallel with the thickness direction using laser Raman spectroscopy
Figure 6:
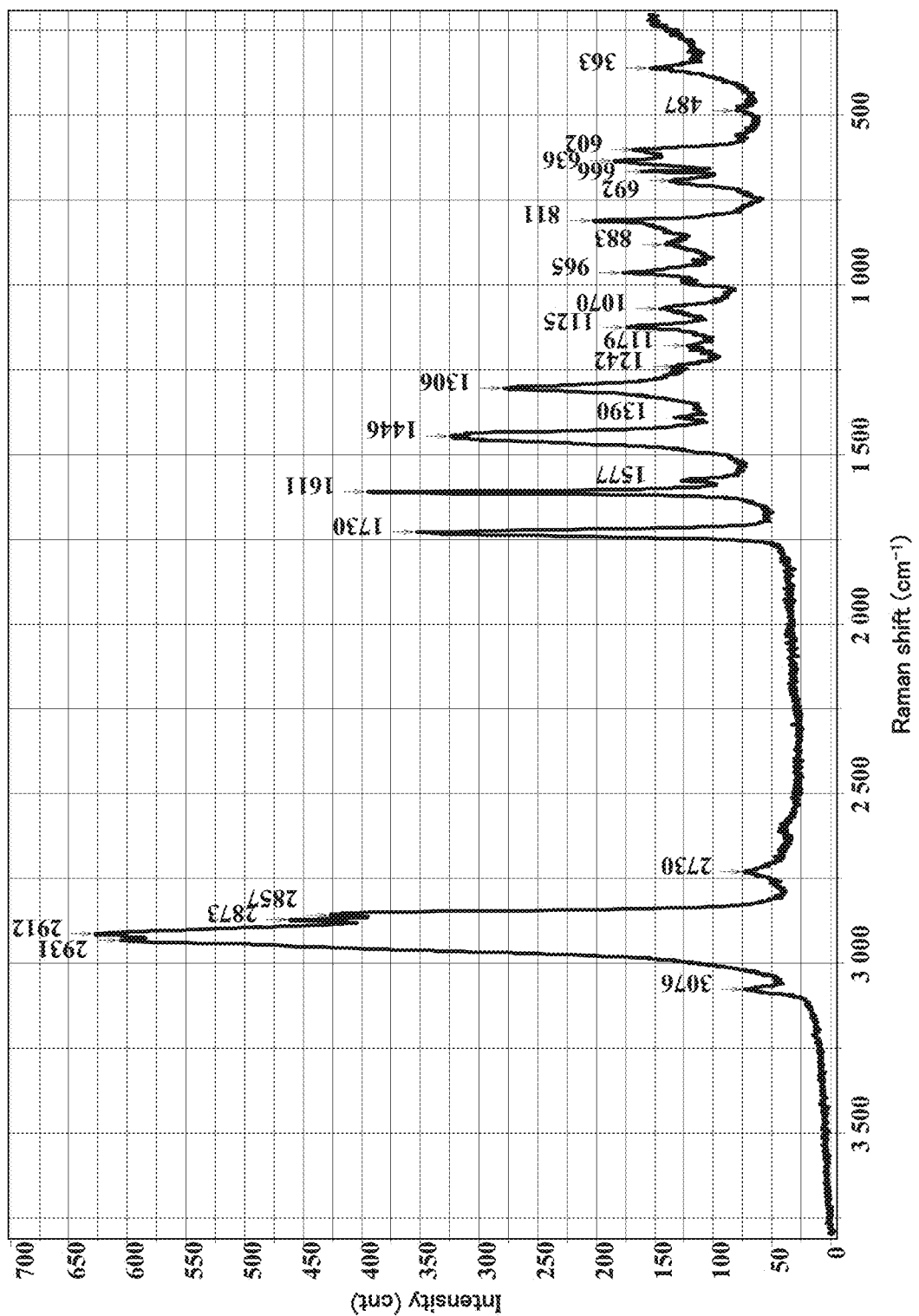
FIG. 6 is a Raman spectrum in a wave number range between 200 cm$^{-1}$ and 3,800 cm$^{-1}$ obtained by analyzing the interfacial portion on the cross section of the powder slush molded body of Example 1 extending in parallel with the thickness direction using laser Raman spectroscopy.
Figure 7:
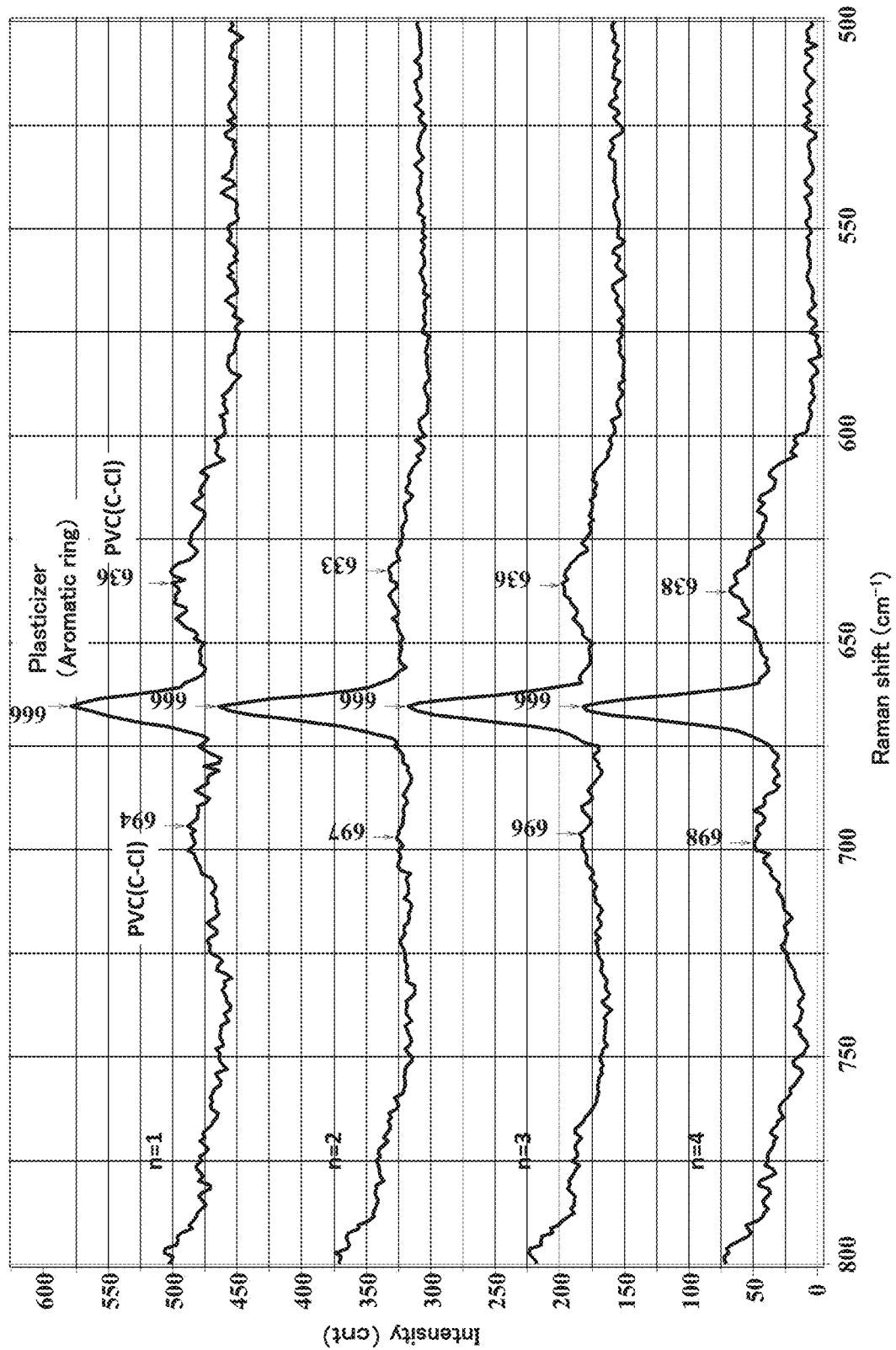
FIG. 7 shows Raman spectra in a wave number range between 500 cm$^{-1}$ and 800 cm$^{-1}$ obtained by analyzing the inner portions of polyvinyl chloride particles on the cross section of the powder slush molded body of Example 1 extending in parallel with the thickness direction using, laser Raman spectroscopy
Figure 8:
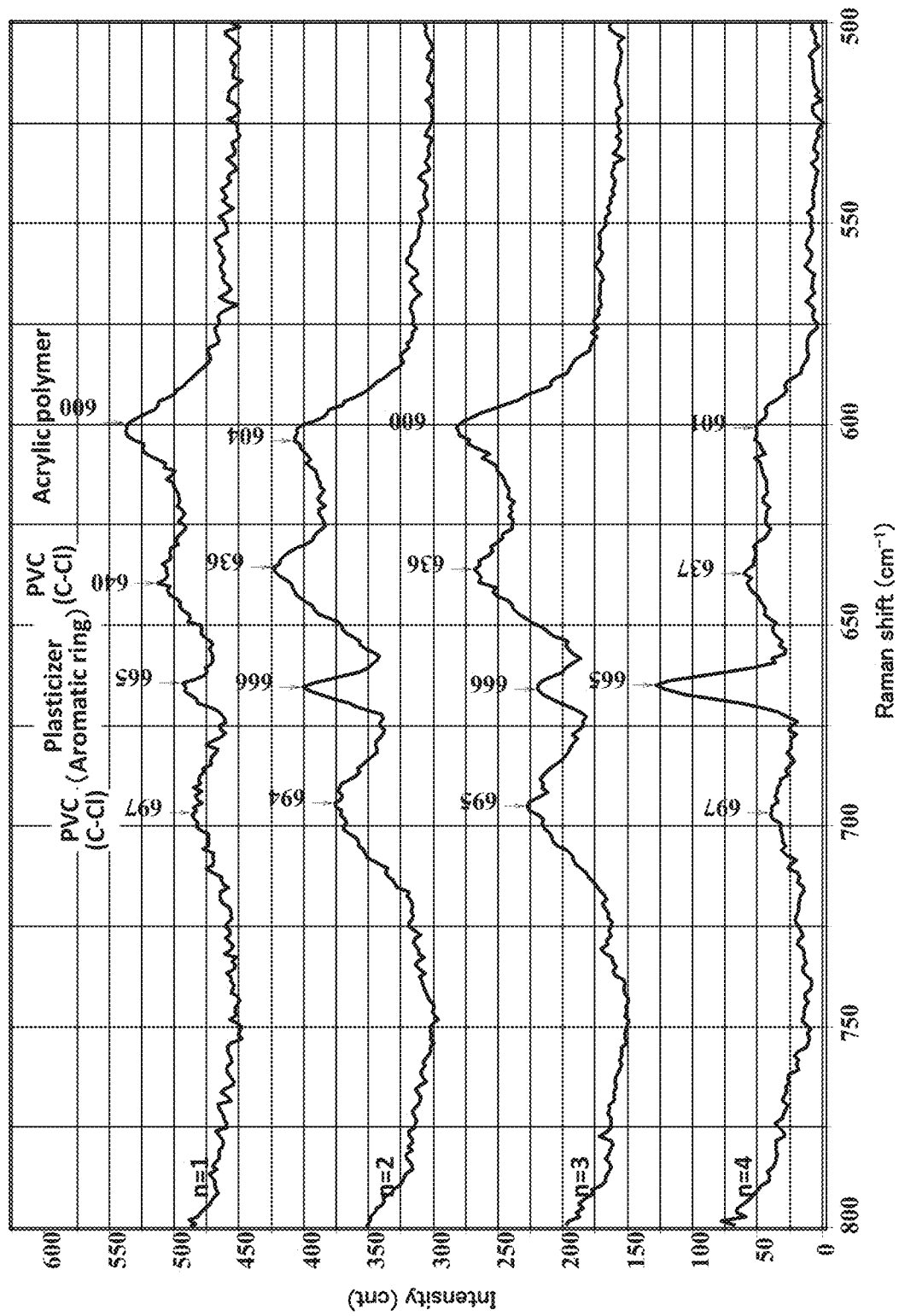
FIG. 8 shows Raman spectra in a wave number range between 500 cm$^{-1}$ and 800 cm$^{-1}$ obtained by analyzing the interfacial portions on the cross section of the powder slush molded body of Example 1 extending in parallel with the thickness direction using laser Raman spectroscopy.

FIGS. 2, 3, and 4 are Raman spectra in a wave number range between 200 cm$^{-1}$ and 3,800 cm$^{-1}$ obtained by analyzing the acrylic polymer A1, the polyvinyl chloride for a paste (vinyl chloride homopolymer with an average degree of polymerization of 1,300 and an average particle diameter of 10 μm), and the plasticizer (tri(n-octyl) trimellitate), respectively using laser Raman spectroscopy FIGS. 5 and 6 are Raman spectra in a wave number range between 200 cm$^{-1}$ and 3,800 cm$^{-1}$ obtained by analyzing the inner portion of a polyvinyl chloride particle and an interfacial portion, respectively on the cross section of the powder slush molded body of Example 1 extending in parallel with the thickness direction using laser Raman spectroscopy. FIG. 7 shows Raman spectra in a wave number range between 500 cm$^{-1}$ and 800 cm$^{-1}$ obtained by analyzing the inner portions of polyvinyl chloride particles on the cross section of the powder slush molded body of Example 1 extending in parallel with the thickness direction using laser Raman spectroscopy. FIG. 8 shows Raman spectra in a wave number range between 500 curl and 800 cm$^{-1}$ obtained by analyzing the interfacial portions on the cross section of the powder slush molded body of Example 1 extending in parallel with the thickness direction using laser Raman spectroscopy. As is clear from a comparison of the Raman spectra of FIGS. 5 to 8 based on the Raman spectra of FIGS. 2 to 4, when the interfacial portion and the inner portion of the polyvinyl chloride particle on the cross section of the powder slush molded body of Example 1 extending in parallel with the thickness direction were analyzed using laser Raman spectroscopy, a peak at a wave number of 600±5 cm$^{-1}$ originating from the acrylic polymer was present in the Raman spectrum of the interfacial portion, but a peak at a wave number of 600±5 cm$^{-1}$ originating from the acrylic polymer was not present in the Raman spectrum of the inner portion of the polyvinyl chloride particle.

When the intensity of the peak at a wave number of 666±5 cm$^{-1}$ originating from the plasticizer (aromatic ring) in each of the four Raman spectra of FIG. 7 obtained by analyzing four positions of the inner portions of the polyvinyl chloride particles using laser Raman spectroscopy was calculated by drawing a base line between two points at a wave number of 750 cm$^{-1}$ and a wave number of 575 cm$^{-1}$ and measuring the peak height, the respective intensities were 127.218 (n=1), 157.248 (n=2), 162.153 (n=3), and 179.750 (n=4), and the average value was 156.592. When the intensity of the peak at a wave number of 666±5 cm$^{-1}$ originating from the plasticizer (aromatic ring) in each of the four Raman spectra of FIG. 8 obtained by analyzing four positions of the interfacial positions using laser Ramnan spectroscopy was calculated by drawing a base line between two points at a wave number of 750 cm$^{-1}$ and a wave number of 575 cm$^{-1}$ and measuring the peak height, the respective intensities were 43.444 (n=1), 97.034 (n=2), 67.751 (n=3), 123.212 (n=4), and the average value was 82.860. The intensity of the peak at a wave number of 666±5 cm$^{-1}$ originating from the plasticizer (aromatic ring) in the Raman spectrum of the inner portion of the polyvinyl chloride particle was 1.9 times as high as the intensity of the peak at a wave number of 666±5 cm$^{-1}$ originating from the plasticizer (aromatic ring) observed in the Raman spectrum of the interfacial portion.

Figure 9:
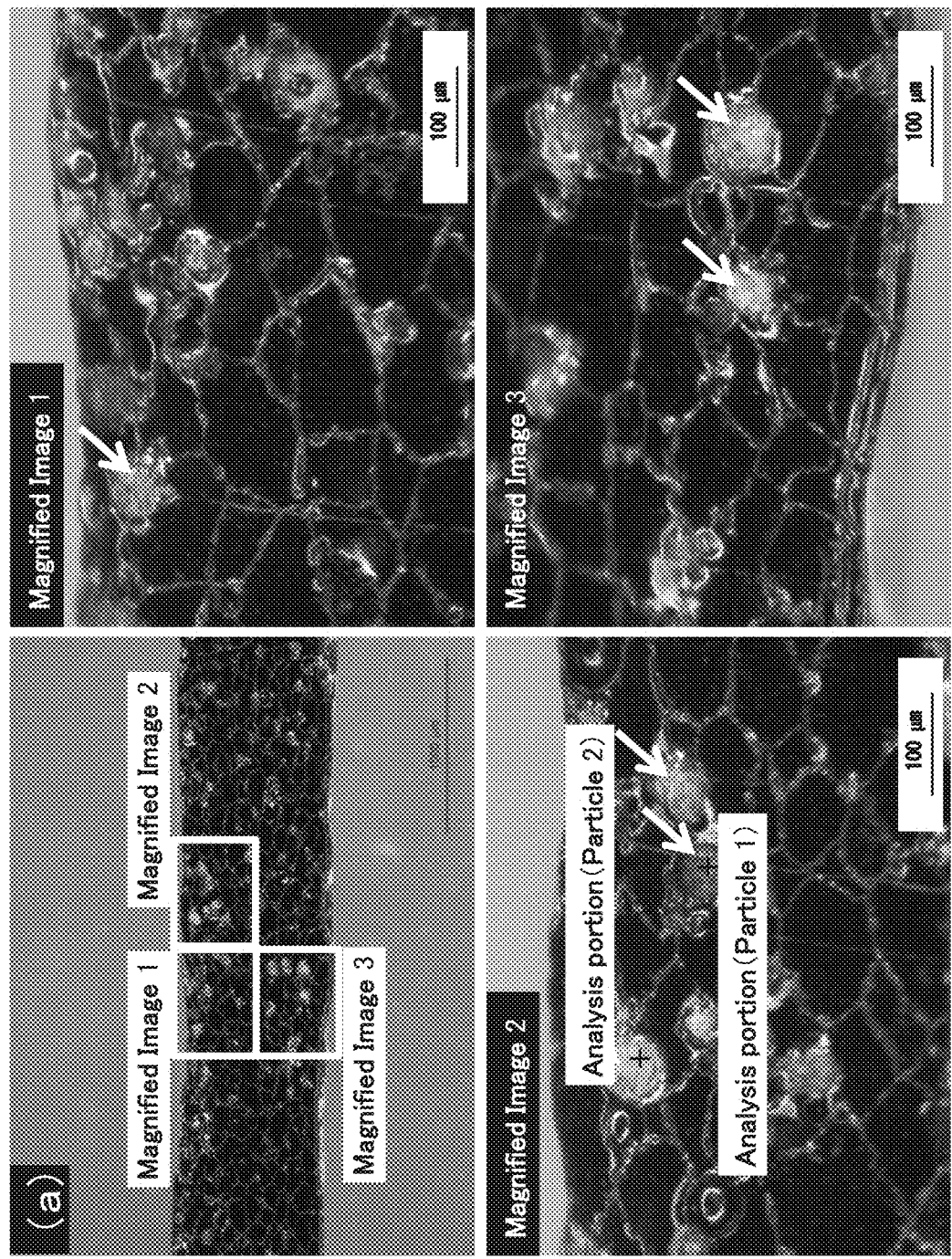
FIG. 9 shows images of a cross section of a powder slush molded body of Comparative Example 1 extending in parallel with a thickness direction observed under an optical microscope using reflected light.

FIG. 9 shows images of a cross section of a powder slush molded body of Comparative Example 1 extending in parallel with a thickness direction observed under an optical microscope using reflected light. FIG. 9(a) is a 20-fold magnified image, and Magnified Images 1 to 3 are partially enlarged views of FIG. 9(a). As is clear from FIG. 9, when the cross section of the powder slush molded body of Comparative Example 1 extending in parallel with the thickness direction was observed under an optical microscope using reflected light, a plurality of white circular objects, namely aggregated particles of the acryl polymer; were present in the image obtained by observing the cross section of the powder slush molded body of Comparative Example 1 extending in parallel with the thickness direction under an optical microscope using reflected light. When twenty random positions were selected in the image of FIG. 9 obtained by observing the cross section of the powder slush molded body extending in parallel with the thickness direction under an optical microscope using reflected light, and the number of aggregated particles of the acrylic polymer at each of the positions and the long diameters of the aggregated particles of the acrylic polymer were measured, the number of aggregated particles of the acrylic polymer having a long diameter of 31 μm or more and 89 μm or less was eighteen particles/mm$^2$ (this value was determined by converting the average of the numbers of aggregated particles of the acrylic polymer present at the twenty positions into the number of particles per mm$^2$). In the image of FIG. 9 obtained by observing the cross section of the powder slush molded body of Comparative Example 1 extending in parallel with the thickness direction under an optical microscope using reflected light, the scale-like objects were black due to the polyvinyl chloride particles containing a black pigment, and the ring-shaped objects (interfacial portions) and the circular objects were white due to the acrylic polymer containing no pigments. When twenty random positions were selected in the image (not shown) obtained by observing the cross section of the powder slush molded body of Comparative Example 7 extending in parallel with the thickness direction under an optical microscope using reflected light in the same manner as in Example 1, and the number of aggregated particles of the acrylic polymer at each of the positions and the long diameters of the aggregated particles of the acrylic polymer were measured, the number of aggregated particles of the acrylic polymer having a long diameter of 31 μm or more and 99 μm or less was twelve particles/mm$^2$ (this value was determined by converting the average of the numbers of aggregated particles of the acrylic polymer present at the twenty positions into the number of particles per mm$^2$).

Figure 10:
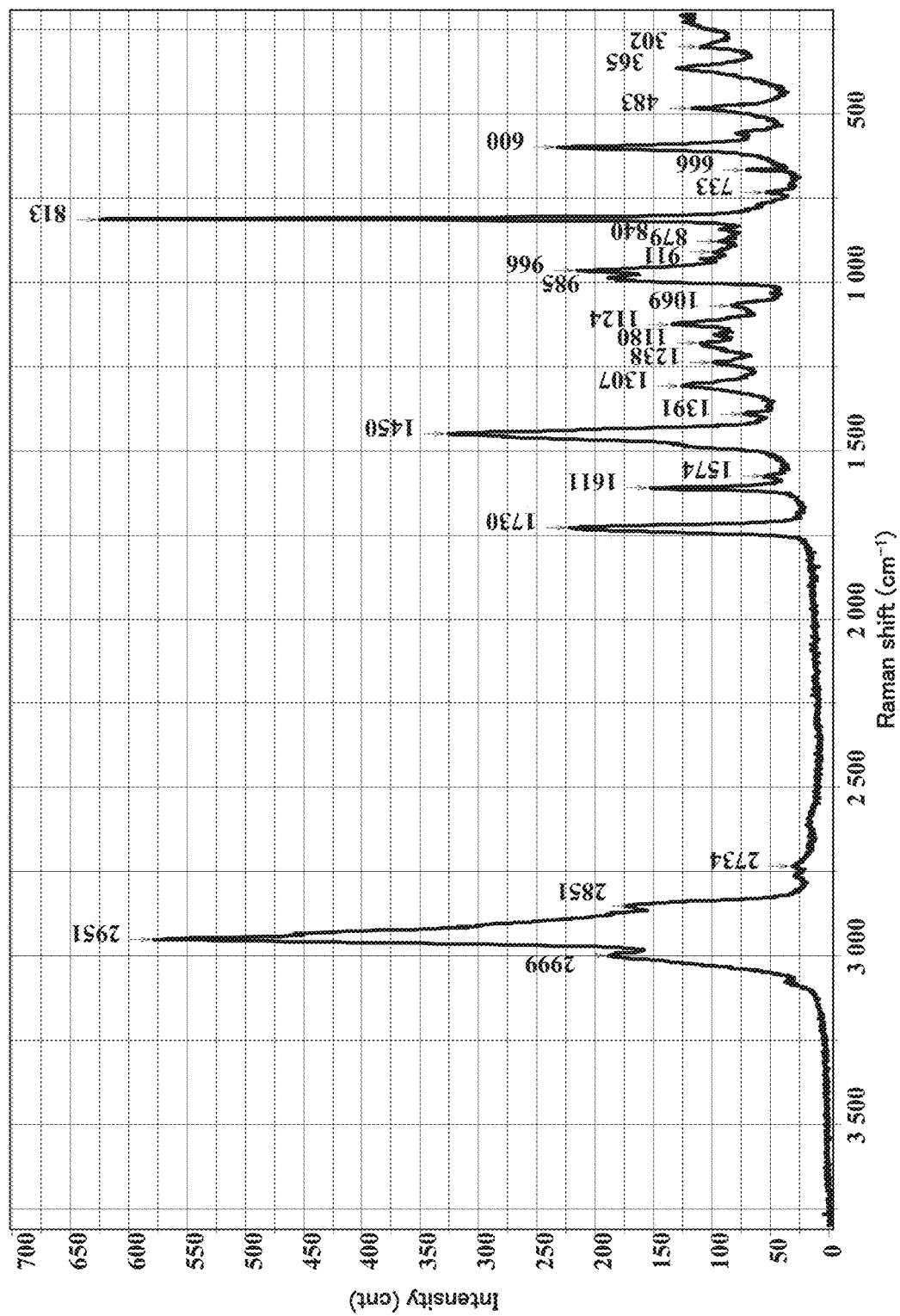
FIG. 10 is a Raman spectrum in a wave number range between 200 cm$^{-1}$ and 3,800 cm$^{-1}$ obtained by analyzing, using laser Raman spectroscopy, a particle 1 (white circular object) shown in the image of the cross section of the powder slush molded body of Comparative Example 1 extending in parallel with a thickness direction observed under an optical microscope using reflected light.
Figure 11:
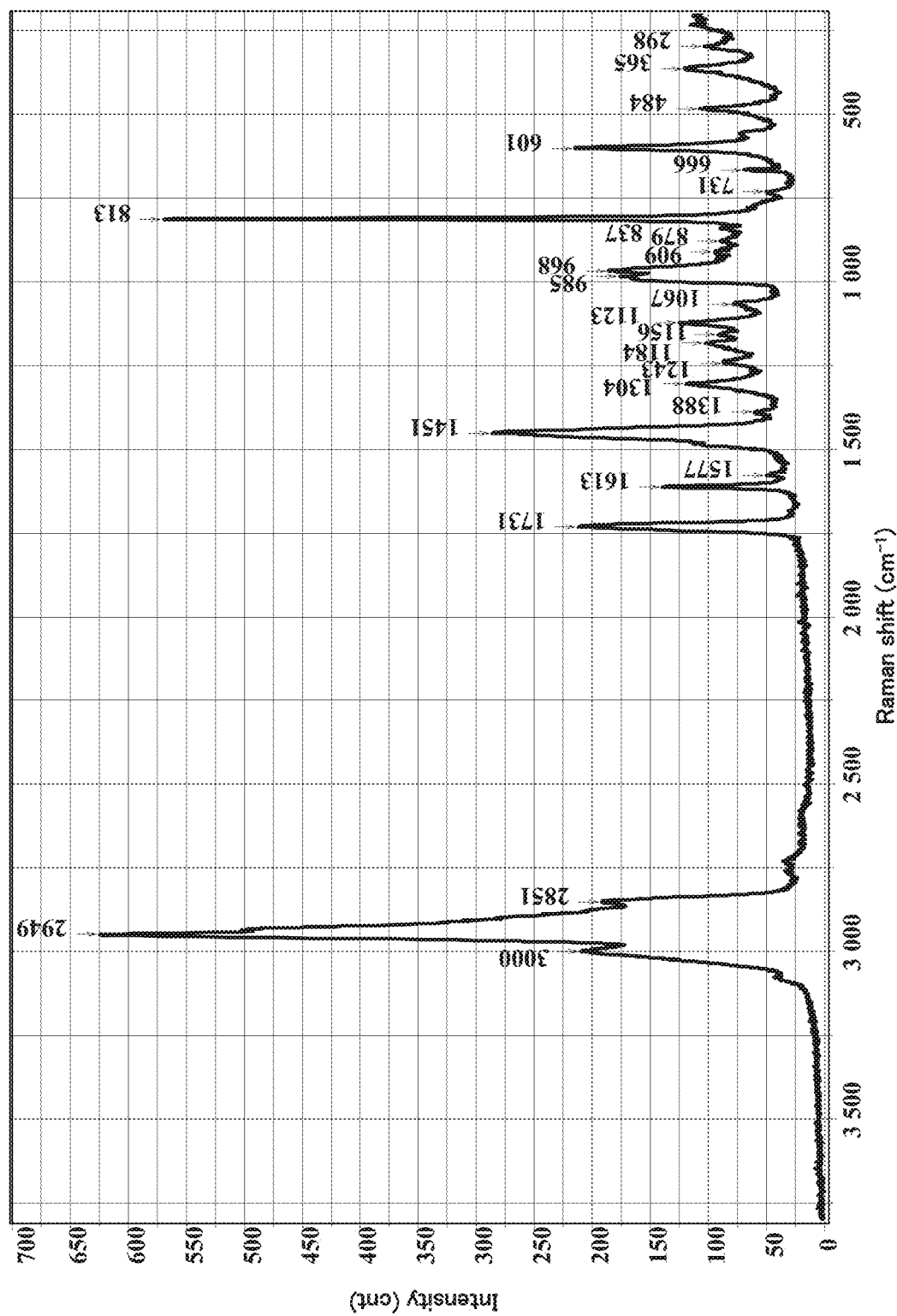
FIG. 11 is a Raman spectrum in a wave number range between 200 cm$^{-1}$ and 3,800 cm$^{-1}$ obtained by analyzing, using laser Raman spectroscopy, a particle 2 (white circular object) shown in the image of the cross section of the powder slush molded body of Comparative Example 1 extending in parallel with a thickness direction observed under an optical microscope using reflected light.
Figure 12:
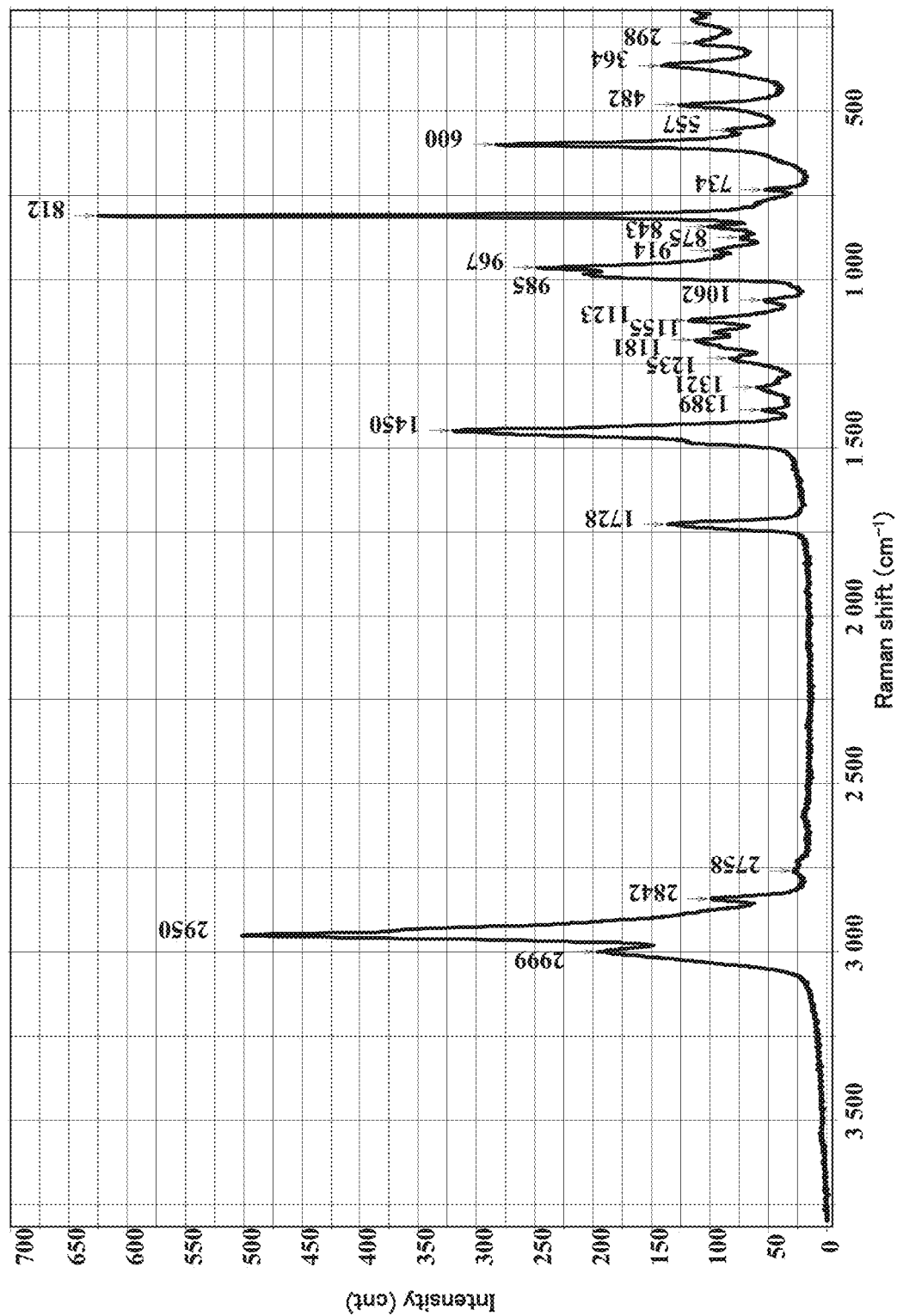
FIG. 12 is a Raman spectrum in a wave number range between 200 cm$^{-1}$ and 3,800 cm$^{-1}$ obtained by analyzing an acrylic polymer A8 using laser Raman spectroscopy

FIGS. 10 to 12 are Raman spectra in a wave number range between 200 cm$^{-1}$ and 3,800 cm$^{-1}$ obtained by analyzing, using laser Raman spectroscopy, a particle 1 (white circular object) and a particle 2 (white circular object) shown in the image of the cross section of the powder slush molded body of Comparative Example 1 extending in parallel with a thickness direction observed under an optical microscope using reflected light, and the acrylic polymer A8, respectively. It was confirmed from a comparison of FIGS. 10 and 11 and FIG. 12 that many peaks corresponding to peaks shown in the Raman spectrum of the acrylic polymer A8 were present in the Raman spectra of the particles 1 and 2, and thus the white circular objects were aggregated particles of the acrylic polymer. The particles 1 and 2 were mainly composed of the acrylic polymer, but contained a small amount of the plasticizer.

Regarding the examples and comparative examples, the adhesive power of the polyvinyl chloride composition was measured as described below. Regarding the examples and comparative examples, the dynamic friction coefficient of the polyvinyl chloride molded body, the 10% tensile strength, tensile strength at break, and tensile elongation at break in the initial state, and the 10% tensile strength, tensile strength at break, and tensile elongation at break after heat aging were measured and evaluated as described below. Tables 2 to 4 below show the results.

Adhesive Power

After being filled with 40 g of the polyvinyl chloride composition, a cylindrical cell with an inner diameter of 5 cm was heated at 30° C. in a constant-temperature oven. After the temperature of the polyvinyl chloride composition rose to 30° C., a piston weighing 1.3 kg and a 5-kg weight (total load was 0.32 kgf/cm$^2$) were placed thereon. Then, the cylindrical cell, piston, and weight were kept at 60° C. in the constant-temperature oven for 2 hours, After 2 hours, these were taken out under the conditions of 23° C. and 50% RH and cooled for 1 hour. Then, the weight and piston were removed therefrom, and a cake of the polyvinyl chloride composition was taken out of the cylindrical cell. The compression breaking strength of the thus-obtained cake was measured using a rheometer (RT-2010J-CW manufactured by RHEOTECH), and the adhesive power was calculated using the formula below.

Adhesive power (gf/cm$^2$)=2×$B$/(3.14×$R$×$D$)

B: Load (N) in crushing test
R: Diameter (mm) of cake
D: Thickness (min) of cake Dynamic Friction Coefficient The measurements were performed in accordance with JIS K 7125:1999. Specifically, an NBR rubber sheet (black rubber), which is a partner material, was slid on the PVC sheet using a universal testing machine ("TENSILON" manufactured by A&D Co., Ltd.) with flat indenter specifications at a test rate of 100 mm/minute and a vertical load of 1.96 N under the conditions of 23° C. and 50% RH (relative humidity), and its kinetic friction was measured. Then, the dynamic friction coefficient was calculated therefrom. The dynamic friction coefficients that were smaller than or equal to 0.80 were acceptable.

10% Tensile Strength, Tensile Strength at Break, and Tensile Elongation at Break in Initial State The PVC sheet was punched into a No. 3 dumbbell shape to obtain a No. 3 dumbbell-shaped sample. Next, the two ends of this sample were held by two chucks (the distance between the chucks was 40 mm). After the sample was kept in a chamber at −10° C. for 3 minutes, a tensile test was performed at a tension speed of 200 mm/minute to measure the 10% tensile strength, tensile strength at break, and tensile elongation at break.

10% Tensile Strength, Tensile Strength at Break, and Tensile Elongation at Break after Heat Aging 1.5 The laminate was placed into an oven and heated at 125° C. for 200 hours, and was thus subjected to heat aging. Thereafter, the PVC sheet was removed from the laminate. The removed PVC sheet was punched into a No. 3 dumbbell shape to obtain a No. 3 dumbbell-shaped sample Next, the two ends of this sample were held by two chucks (the distance between the chucks was 40 mm). After the sample was kept in a chamber at −10° C. for 3 minutes, a tensile test was performed at a tension speed of 200 mm/minute to measure the 10% tensile strength, tensile strength at break, and tensile elongation at break. The PVC sheets were determined as being acceptable when the 10% tensile strength was 14.0 MPa or less after heat aging.

TABLE 2

| | | | Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Formulation of polyvinyl chloride composition | Polyvinyl chloride (A) | KS-1700 | 100 | 100 | 100 | 100 | 100 | 100 | 100 | 100 | 100 | 100 | 100 | 100 |
| | | S1004D Part | — | — | — | — | — | — | — | — | — | — | — | — |
| | Plasticizer Part | | 120 | 120 | 120 | 120 | 120 | 120 | 120 | 120 | 120 | 120 | 120 | 120 |
| | Acrylic modified polyorganosiloxane Part | | — | — | 2 | 2 | 2 | — | 2 | 2 | 2 | 2 | 2 | 2 |
| | Polyvinyl chloride (B) | PSL-31 Part | — | 10 | — | — | — | 10 | 13 | 10 | 10 | 10 | 10 | 10 |
| | | PSM-31 Part | — | — | — | 3 | 7 | — | — | 5 | — | — | — | — |
| | Acrylic polymer | A1 MMA/iBMA = 60/40 Part | 20 | 10 | 20 | 17 | 13 | 10 | 7 | 5 | — | — | — | — |
| | | A2 MMA/iBMA = 75/25 Part | — | — | — | — | — | — | — | — | 10 | — | — | — |
| | | A3 MMA/iBMA = 80/20 Part | — | — | — | — | — | — | — | — | — | 10 | — | — |
| | | A4 MMA/iBMA = 85/15 Part | — | — | — | — | — | — | — | — | — | — | 10 | — |
| | | A5 MMA/iBMA = 90/10 Part | — | — | — | — | — | — | — | — | — | — | — | 10 |
| Physical properties of polyvinyl chloride molded body | Dynamic friction coefficient | JIS K 7125 | 0.506 | 0.625 | 0.467 | 0.475 | 0.477 | 0.485 | 0.598 | 0.655 | 0.517 | 0.537 | 0.524 | 0.531 |
| | Initial state | 10% tensile strength MPa | 9.9 | 7.9 | 9.6 | 9.6 | 8.7 | 8.0 | 7.5 | 7.0 | 7.6 | 8.7 | 8.6 | 8.3 |
| | | Tensile strength at break MPa | 16.0 | 18.8 | 14.9 | 16.4 | 17.6 | 17.9 | 18.1 | 18.9 | 18.4 | 17.8 | 17.1 | 17.0 |
| | | Tensile elongation at break % | 68 | 138 | 60 | 76 | 96 | 118 | 129 | 149 | 122 | 117 | 104 | 103 |
| | After heat aging | 10% tensile strength MPa | 13.3 | 10.6 | 12.9 | 12.3 | 12.3 | 11.1 | 11.6 | 11.0 | 11.5 | 12.2 | 13.0 | 13.0 |
| | | Tensile strength at break MPa | 18.1 | 19.3 | 17.9 | 18.5 | 19.5 | 19.2 | 20.6 | 21.0 | 20.3 | 19.1 | 19.6 | 19.8 |
| | | Tensile elongation at break % | 53 | 102 | 54 | 69 | 79 | 88 | 93 | 103 | 95 | 82 | 91 | 69 |
| | Rate of change of 10% tensile strength (After aging-initial state)/initial state % | | 34.3 | 34.2 | 34.4 | 28.1 | 41.4 | 38.8 | 54.7 | 57.1 | 51.3 | 40.2 | 51.2 | 56.6 |
| Powder characteristics | Blocking properties | Adhesive powder gf/cm² | <50 | <50 | <50 | <50 | <50 | <50 | <50 | <50 | <50 | <50 | <50 | <50 |

TABLE 3

| | | | | Example | | | | Comparative Example | | | | | | |
|---|---|---|---|---|---|---|---|---|---|---|---|---|---|---|
| | | | | 13 | 14 | 15 | 16 | 1 | 2 | 3 | 4 | 5 | 6 | 7 |
| Formulation of polyvinyl chloride composition | Polyvinyl chloride (A) | KS-1700 | Part | — | 100 | 100 | 100 | 100 | 100 | 100 | 100 | 100 | — | 100 |
| | | S1004D | Part | 100 | — | — | — | — | — | — | — | — | 100 | — |
| | Plasticizer | | Part | 110 | 120 | 120 | 120 | 120 | 120 | 120 | 120 | 120 | 100 | 125 |
| | Acrylic modified polyorganosiloxane | | Part | 2 | — | 2 | 2 | 2 | — | 2 | 2 | 2 | 2 | 2 |
| | Polyvinyl chloride (B) | PSL-31 | Part | 10 | — | — | — | — | — | — | — | 20 | 10 | — |
| | | PSM-31 | Part | 5 | 13 | 10 | 10 | — | 20 | 17 | 20 | — | 5 | 10 |
| | Acrylic polymer | A1 MMA/iBMA = 60/40 | Part | 5 | 7 | — | — | — | — | 3 | — | — | 5 | — |
| | | A6 MMA/iBMA = 95/5 | Part | — | — | — | 10 | — | — | — | — | — | — | — |
| | | A7 MMA/iBMA = 40/60 | Part | — | — | 10 | — | — | — | — | — | — | — | — |
| | | A8 MMA = 100 | Part | — | — | — | — | 20 | — | — | — | — | — | 10 |
| Physical properties of polyvinyl chloride molded body | Dynamic friction coefficient | JIS K 7125 | — | 0.493 | 0.724 | 0.670 | 0.697 | 0.840 | 1.256 | 0.984 | 1.062 | 0.998 | 0.49 | 1.056 |
| | Initial state | 10% tensile strength | MPa | 8.5 | 6.7 | 8.7 | 7.1 | 6.9 | 7.6 | 6.2 | 6.4 | 7.2 | 11.9 | 3.8 |
| | | Tensile strength at break | MPa | 19.6 | 19.4 | 17.8 | 17.2 | 19.1 | 21.4 | 18.9 | 20.1 | 20.0 | 21.1 | 13.3 |
| | | Tensile elongation at break | % | 119 | 147 | 117 | 96 | 145 | 175 | 155 | 158 | 155 | 83 | 165 |
| | After heat aging | 10% tensile strength | MPa | 13.2 | 10.7 | 10.7 | 10.0 | 14.1 | 10.8 | 10 | 11.6 | 10.9 | 17.4 | 7.2 |
| | | Tensile strength at break | MPa | 21.9 | 20.7 | 20.3 | 19.5 | 19.0 | 21.4 | 21.5 | 21.8 | 21.1 | 23.1 | 18.6 |
| | | Tensile elongation at break | % | 102 | 147 | 95 | 87 | 58 | 126 | 124 | 118 | 112 | 77 | 165 |
| | Rate of change of 10% tensile strength (after aging-initial state)/initial state | | % | 55.3 | 59.7 | 23.0 | 40.8 | 104.3 | 42.1 | 61.3 | 81.3 | 51.4 | 46.2 | 89.5 |
| Powder characteristics | Blocking properties | Adhesive powder | gf/cm² | <50 | <50 | >5000 | <50 | <50 | 240 | <50 | 110 | 210 | <50 | 450 |

TABLE 4

| | | | | Example | | | | | | |
|---|---|---|---|---|---|---|---|---|---|---|
| | | | | 17 | 18 | 19 | 20 | 21 | 22 | 23 |
| Formulation of polyvinyl chloride composition | Polyvinyl chloride (A) (KS-1700) | | Part | 100 | 100 | 100 | 100 | 100 | 100 | 10 |
| | Plasticizer | | Part | 120 | 120 | 120 | 120 | 125 | 125 | 125 |
| | Acrylic modified polyorganosiloxane | | Part | 2 | 2 | 2 | 9 | 2 | 2 | 2 |
| | Polyvinyl chloride (B) (PSM-31) | | Part | 10 | 10 | 10 | 10 | 10 | 10 | 10 |
| | Acrylic polymer | A5 MMA/iBMA = 90/10 | Part | — | — | — | — | 10 | — | — |
| | | B1 MMA/nBMA/iBMA = 61/21.4/17.6 | Part | 10 | — | — | — | — | — | — |
| | | C1 MMA/iBMA = 60/40 | Part | — | 10 | — | — | — | — | — |
| | | C2 MMA/iBMA = 60/40 | Part | — | — | 10 | — | — | — | — |
| | | D1 MMA/nBMA = 60/40 | Part | — | — | — | 10 | — | — | — |
| | | E1 MMA/DMA = 90/10 | Part | — | — | — | — | — | 10 | — |
| | | E2 MMA/CHMA = 90/10 | Part | — | — | — | — | — | — | 10 |
| Physical properties of polyvinyl | Dynamic friction coefficient | JIS K 7125 | — | 0.595 | 0.516 | 0.506 | 0.647 | 0.560 | 0.713 | 0.594 |

TABLE 4-continued

| | | | | Example | | | | | | |
|---|---|---|---|---|---|---|---|---|---|---|
| | | | | 17 | 18 | 19 | 20 | 21 | 22 | 23 |
| chloride molded body | Initial state | 10% tensile strength | MPa | 6.8 | 8.8 | 8.5 | 6.5 | 6.0 | 3 | 5.7 |
| | | Tensile strength at break | MPa | 18.4 | 18.6 | 18.5 | 18.4 | 13.8 | 15.5 | 14.9 |
| | | Tensile elongation at break | % | 122 | 123 | 118 | 133 | 126 | 178 | 147 |
| | After heat aging | 10% tensile strength | MPa | 9.9 | 13.6 | 12.0 | 11.1 | 8.3 | 9.1 | 8.4 |
| | | Tensile strength at break | MPa | 18.9 | 21.3 | 20.3 | 20.2 | 18.7 | 19.8 | 18.5 |
| | | Tensile elongation at break | % | 90 | 94 | 103 | 91 | 119 | 117 | 110 |
| | Rate of change of 10% tensile strength (after aging-initial state)/initial state | | % | 45.6 | 54.5 | 41.2 | 70.8 | 38.3 | 71.7 | 47.4 |
| Powder characteristics | Blocking properties | Adhesive powder | gf/cm$^2$ | 1.30 | <50 | <50 | 1850 | <50 | 440 | <50 |

As is clear from the results shown in Table 2, when the cross sections of the powder slush molded bodies extending in parallel with the thickness direction were observed under an optical microscope using reflected light, Example 1 in which irregular scale-like polyvinyl chloride particles were continuous with one another via interfacial portions and the aggregated particles of the acrylic polymer were not present, and Examples 14 and 16 in which the number of aggregated particles of the acrylic polymer was 10 or less particles/mm$^2$ had low dynamic friction coefficient, and thus the surface characteristics were favorable. In addition, they had low 10% tensile strength, and thus their flexibility after heat aging was favorable. Moreover, as is clear from the results shown in Tables 2 to 4 above, the polyvinyl chloride molded bodies of Examples 2 to 23 also had low dynamic friction coefficient, and thus the surface characteristics were favorable, in addition, they had low 10% tensile strength, and thus their flexibility after heat aging was favorable. It was revealed from a comparison of Example 1 and Example 3 and a comparison of Example 2 and Example 6 that, in the cases where acrylic modified polyorganosiloxane was contained, the dynamic friction coefficient was smaller, and thus the surface characteristics were improved. It was revealed from a comparison between Examples 3 to 8 that the larger the blend amount of the acrylic polymer was, the smaller the dynamic friction coefficient was, and thus the surface characteristics were improved. It was revealed from a comparison between Examples 6, 9 to 12, 15, and 16 that, in the cases where the acrylic polymer contained at least one selected from the group consisting of n-butyl (meth)acrylate, isobutyl (meth)acrylate, and tert-butyl (meth)acrylate in an amount of 10 mass % or more and 50 mass % or less, the dynamic friction coefficient was smaller, and thus the surface characteristics were improved.

On the other hand, as is clear from the results shown in Table 3, in the cases of Comparative Examples 1 and 7 in which the number of the aggregated particles of the acrylic polymer having a long diameter of 30 µm or more and 100 µm or less was more than 10 particles/mm$^2$ when the cross section of the powder slush molded body extending in parallel with the thickness direction was observed under an optical microscope using reflected light, the dynamic friction coefficient exceeded 0.80, and thus the surface characteristics were poor. In the case of Comparative Example 1, the 10% tensile strength after heat aging exceeded 14.0 MPa, and thus the flexibility after heat aging was also poor. As is clear from the results shown in Table 3, in the cases of the powder slush molded bodies of Comparative Examples 2 to 5, the dynamic friction coefficient exceeded 0.80, and thus the surface characteristics were poor. In the case of Comparative Example 6 in which the blend amount of the plasticizer was less than 110 parts by mass, the 10% tensile strength after heat aging exceeded 14.0 MPa, and thus the flexibility after heat aging was poor.

The invention claimed is:

1. A powder slush molded body of a polyvinyl chloride composition, the polyvinyl chloride composition comprising:
   a polyvinyl chloride in an amount of 100 parts by mass,
   a plasticizer in an amount of 110 to 150 parts by mass, and
   an acrylic polymer in an amount of 4 to 23 parts by mass,
   wherein the acrylic polymer contains a constitutional unit derived from methyl (meth)acrylate in an amount of 50 to 90 mass %, and a constitutional unit derived from at least one (meth)acrylic ester one (meth)acrylic ester selected from the group consisting of n-butyl (meth)acrylate, isobutyl (meth)acrylate, and tert-butyl (meth)acrylate in an amount of 10 to 50 mass %,
   wherein when a cross section of the powder slush molded body extending in parallel with a thickness direction is observed under an optical microscope using reflected light, irregular scale-like polyvinyl chloride particles having a long diameter of 30 µm to 500 µm are continuous with one another via interfacial portions,
   wherein the number of aggregated particles of the acrylic polymer having a long diameter of 30 µm to 100 µm is 10 particles/mm$^2$ or less, and
   wherein the powder slush molded body has a dynamic friction coefficient is from 0.467 to 0.655.

2. The powder slush molded body according to claim 1, wherein, when the cross section of the powder slush molded body extending in parallel with the thickness direction is analyzed using laser Raman spectroscopy, a peak at a wave number of 600±5 cm$^{-1}$ originating from the acrylic polymer is present in a Raman spectrum of the interfacial portion.

3. The powder slush molded body according to claim 1, wherein, when the cross section of the powder slush molded body extending in parallel with the thickness direction is analyzed using laser Raman spectroscopy, an intensity of a peak at a wave number of 666±5 cm$^{-1}$ originating from the plasticizer observed in a Raman spectrum of an inner portion of the polyvinyl chloride particle is higher than an intensity of a peak at a wave number of 666±5 cm$^{-1}$ originating from the plasticizer observed in a Raman spectrum of the interfacial portion.

4. The powder slush molded body according to claim 1, wherein the interfacial portion has a thickness of 1 µm to 20 µm.

5. The powder slush molded body according to claim 1, wherein the plasticizer includes a trimellitate-based plasticizer.

6. A facing for a vehicle interior material, comprising the powder slush molded body according to claim 1.

7. A laminate obtained by laminating a polyurethane foam layer and the powder slush molded body according to claim 1.

8. A vehicle interior material, comprising the laminate according to claim 7.

* * * * *